United States Patent
Yamazaki

(10) Patent No.: US 11,151,116 B2
(45) Date of Patent: Oct. 19, 2021

(54) DISTRIBUTED DATA MANAGEMENT PROGRAM, DISTRIBUTED DATA MANAGEMENT METHOD, AND DISTRIBUTED DATA MANAGEMENT APPARATUS

(71) Applicant: FUJITSU LIMITED, Kawasaki (JP)

(72) Inventor: Masanori Yamazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 600 days.

(21) Appl. No.: 15/983,817

(22) Filed: May 18, 2018

(65) Prior Publication Data

US 2018/0341672 A1 Nov. 29, 2018

(30) Foreign Application Priority Data

May 23, 2017 (JP) .............................. JP2017-101520

(51) Int. Cl.
*G06F 16/23* (2019.01)
*G06F 16/27* (2019.01)
*G06F 16/22* (2019.01)

(52) U.S. Cl.
CPC ...... *G06F 16/2365* (2019.01); *G06F 16/2228* (2019.01); *G06F 16/2379* (2019.01); *G06F 16/27* (2019.01)

(58) Field of Classification Search
CPC .. G06F 16/2365; G06F 16/27; G06F 16/2379; G06F 16/2228
USPC ...................................................... 707/696
See application file for complete search history.

(56) References Cited

U.S. PATENT DOCUMENTS

| | | | | |
|---|---|---|---|---|
| 9,183,303 B1* | 11/2015 | Goel | ................... | G06F 16/2228 |
| 2005/0226420 A1* | 10/2005 | Makela | ................ | H04L 9/0891 |
| | | | | 380/270 |
| 2012/0078914 A1* | 3/2012 | Roeder | ................... | H04L 9/008 |
| | | | | 707/741 |
| 2013/0151492 A1* | 6/2013 | Kirihata | ................ | G06F 16/134 |
| | | | | 707/696 |
| 2013/0297788 A1* | 11/2013 | Itoh | ...................... | H04L 43/0876 |
| | | | | 709/224 |
| 2014/0105302 A1* | 4/2014 | Takehara | ............. | H04N 19/176 |
| | | | | 375/240.15 |
| 2015/0293960 A1* | 10/2015 | Sharma | ............... | G06F 16/2272 |
| | | | | 707/741 |

FOREIGN PATENT DOCUMENTS

| | | |
|---|---|---|
| JP | 9-6663 | 1/1997 |
| JP | 2011-118950 | 6/2011 |

* cited by examiner

*Primary Examiner* — Kimberly L Wilson
(74) *Attorney, Agent, or Firm* — Fujitsu Patent Center

(57) ABSTRACT

A distributed data management method performed by a distributed data management apparatus for holding a plurality of indexes which specify storage positions of data to be distributed in a network system, the method includes steps of: in a case where any one of the held indexes is deleted, adding an identifier of the deleted index to a first invalid list held by the distributed data management apparatus; and in a case where it is determined that an index requested from an information processing apparatus is not held, transmitting the first invalid list to the information processing apparatus.

6 Claims, 38 Drawing Sheets

FIG. 6

| TEMPERATURE | HUMIDITY | DATE AND TIME |
|---|---|---|
| 13.5 | 60 | 2017/4/1 00:30:00 |
| 12.4 | 65 | 2017/4/1 01:30:00 |
| 11.2 | 67 | 2017/4/1 02:30:00 |
| ... | ... | ... |
| 14.8 | 40 | 2017/4/1 23:30:00 |

FIG. 7

| INDEX ID | INDEX | TIME STAMP | STORAGE POSITION | REFERENCE POINTER | NODE ID |
|---|---|---|---|---|---|
| A001 | INDEX S | Ta001 | ADR_S(1) | NONE | NONE |
| A002 | INDEX S | Ta002 | ADR_S(2) | NONE | NONE |
| A003 | INDEX S | Ta003 | ADR_S(3) | NONE | NONE |
| ... | ... | ... | ... | ... | ... |
| A024 | INDEX S | Ta024 | ADR_S(24) | NONE | NONE |

FIG. 9

| INDEX ID | INDEX | TIME STAMP | STORAGE POSITION | REFERENCE POINTER | NODE ID |
|---|---|---|---|---|---|
| B001 | INDEX T | Tb001 | ADR_T(1) | NONE | NONE |
| B002 | INDEX T | Tb002 | ADR_T(2) | NONE | NONE |
| B003 | INDEX T | Tb003 | ADR_T(3) | NONE | NONE |
| ... | ... | ... | ... | ... | ... |
| B024 | INDEX T | Tab024 | ADR_T(24) | NONE | NONE |

FIG. 12

| TEMPERATURE | HUMIDITY | DATE AND TIME |
|---|---|---|
| 11.5 | 63 | 2017/4/1 03:00:00 |
| 18.5 | 52 | 2017/4/1 09:00:00 |
| 22.0 | 48 | 2017/4/1 15:00:00 |
| 16.6 | 47 | 2017/4/1 21:00:00 |

FIG. 13

| INDEX ID | INDEX | TIME STAMP | STORAGE POSITION | REFERENCE POINTER | NODE ID |
|---|---|---|---|---|---|
| A001 | INDEX S | Ta001 | ADR_S(1) | NONE | NONE |
| A002 | INDEX S | Ta002 | ADR_S(2) | NONE | NONE |
| A003 | INDEX S | Ta003 | ADR_S(3) | NONE | NONE |
| ... | ... | ... | ... | ... | ... |
| A024 | INDEX S | Ta024 | ADR_S(24) | NONE | NONE |
| A025 | INDEX A1 | Ta025 | ADR_A1(1) | A001, A002, ..., A006 | EN_A, EN_A, EN_A, EN_A, EN_A, EN_A |
| A026 | INDEX A1 | Ta026 | ADR_A1(2) | A007, A008, ..., A012 | EN_A, EN_A, EN_A, EN_A, EN_A, EN_A |
| A027 | INDEX A1 | Ta027 | ADR_A1(3) | A013, A014, ..., A018 | EN_A, EN_A, EN_A, EN_A, EN_A, EN_A |
| A028 | INDEX A1 | Ta028 | ADR_A1(3) | A019, A020, ..., A024 | EN_A, EN_A, EN_A, EN_A, EN_A, EN_A |

FIG. 15

| INDEX ID | INDEX | TIME STAMP | STORAGE POSITION | REFERENCE POINTER | NODE ID |
|---|---|---|---|---|---|
| B001 | INDEX T | Tb001 | ADR_T(1) | NONE | NONE |
| B002 | INDEX T | Tb002 | ADR_T(2) | NONE | NONE |
| B003 | INDEX T | Tb003 | ADR_T(3) | NONE | NONE |
| ... | ... | ... | ... | ... | ... |
| B024 | INDEX T | Tab024 | ADR_T(24) | NONE | NONE |
| B025 | INDEX B1 | Tab025 | ADR_B1(1) | B001, B002, ... B006 | EN_B, EN_B, EN_B, EN_B |
| B026 | INDEX B1 | Tab026 | ADR_B1(2) | B007, B008, ... B012 | EN_B, EN_B, EN_B, EN_B |
| B027 | INDEX B1 | Tab027 | ADR_B1(3) | B013, B014, ... B018 | EN_B, EN_B, EN_B, EN_B |
| B028 | INDEX B1 | Tab028 | ADR_B1(3) | B019, B020, ... B024 | EN_B, EN_B, EN_B, EN_B |

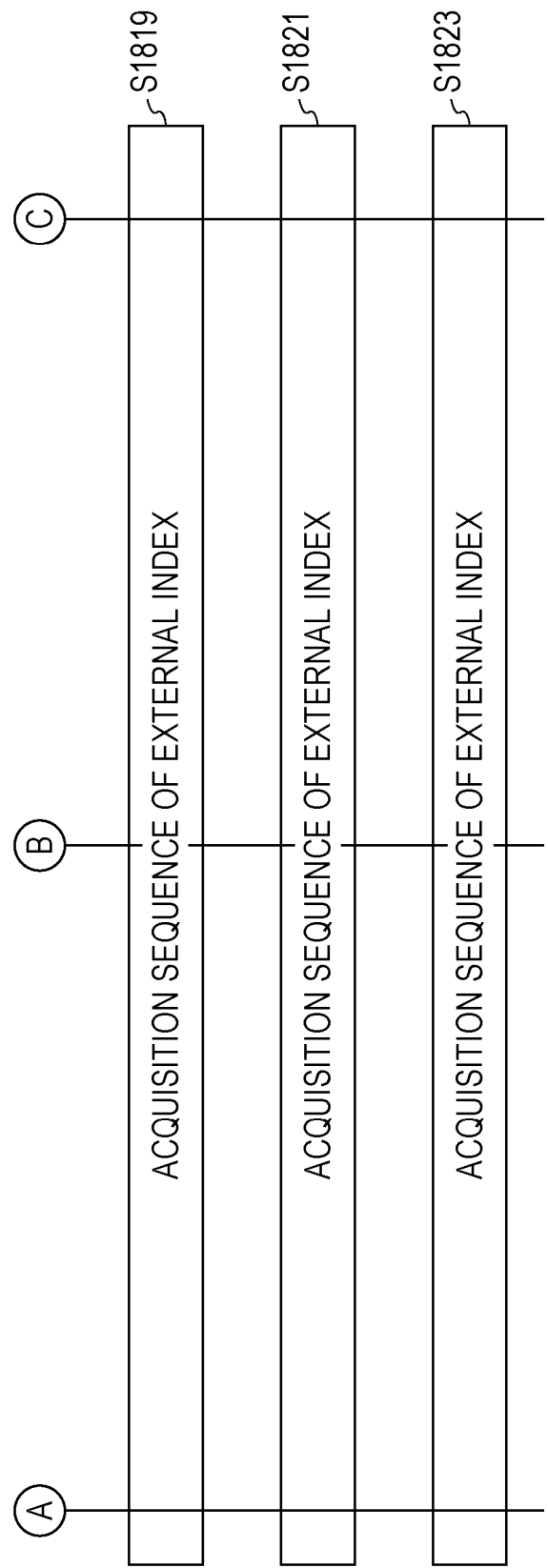

FIG. 20

| TEMPERATURE | DATE AND TIME |
|---|---|
| 17.2 | 2017/4/1 12:00:00 |

FIG. 21

| INDEX ID | INDEX | TIME STAMP | STORAGE POSITION | REFERENCE POINTER | NODE ID |
|---|---|---|---|---|---|
| A001 | INDEX S | Ta001 | ADR_S(1) | NONE | NONE |
| A002 | INDEX S | Ta002 | ADR_S(2) | NONE | NONE |
| A003 | INDEX S | Ta003 | ADR_S(3) | NONE | NONE |
| ... | ... | ... | ... | ... | ... |
| A024 | INDEX S | Ta024 | ADR_S(24) | NONE | NONE |
| A025 | INDEX A1 | Ta025 | ADR_A1(1) | A001, A002, ..., A006 | EN_A, EN_A, EN_A, EN_A, EN_A, EN_A |
| A026 | INDEX A1 | Ta026 | ADR_A1(2) | A007, A008, ..., A012 | EN_A, EN_A, EN_A, EN_A, EN_A, EN_A |
| A027 | INDEX A1 | Ta027 | ADR_A1(3) | A013, A014, ..., A018 | EN_A, EN_A, EN_A, EN_A, EN_A, EN_A |
| A028 | INDEX A1 | Ta028 | ADR_A1(3) | A019, A020, ..., A024 | EN_A, EN_A, EN_A, EN_A, EN_A, EN_A |
| A029 | INDEX A2 | Ta029 | ADR_A2(1) | A025, A026, A027, A028, B025, B026, B027, B028 | EN_A, EN_A, EN_A, EN_A, EN_B, EN_B, EN_B, EN_B |

FIG. 22

| INDEX ID | INDEX | TIME STAMP | STORAGE POSITION | REFERENCE POINTER | NODE ID |
|---|---|---|---|---|---|
| B001 | INDEX T | Tb001 | ADR_T(1) | NONE | NONE |
| B002 | INDEX T | Tb002 | ADR_T(2) | NONE | NONE |
| B003 | INDEX T | Tb003 | ADR_T(3) | NONE | NONE |
| ... | ... | ... | ... | ... | ... |
| B024 | INDEX T | Tab024 | ADR_T(24) | NONE | NONE |
| B025 | INDEX B1 | Tab025 | ADR_B1(1) | B001, B002, ... B006 | EN_B, EN_B, EN_B, EN_B |
| B026 | INDEX B1 | Tab026 | ADR_B1(2) | B007, B008, ... B012 | EN_B, EN_B, EN_B, EN_B |
| B027 | INDEX B1 | Tab027 | ADR_B1(3) | B013, B014, ... B018 | EN_B, EN_B, EN_B, EN_B |
| B028 | INDEX B1 | Tab028 | ADR_B1(3) | B019, B020, ... B024 | EN_B, EN_B, EN_B, EN_B |
| B029 | INDEX B2 | Tab029 | ADR_B2(1) | A025, A026, A027, A028, B025, B026, B027, B028 | EN_A, EN_A, EN_A, EN_B, EN_B, EN_B, EN_B, EN_B |

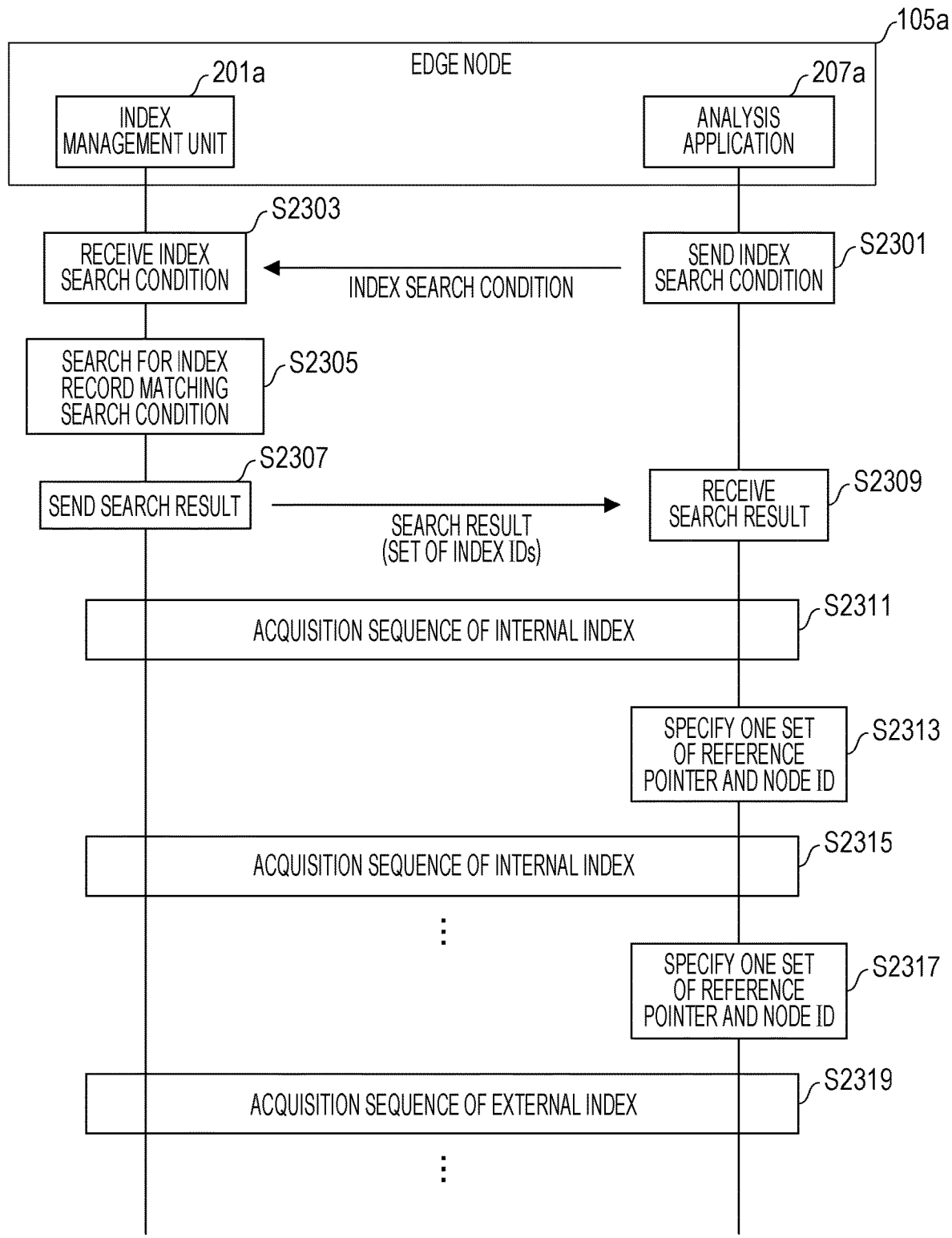

FIG. 24

| INDEX ID | INDEX | TIME STAMP | STORAGE POSITION | REFERENCE POINTER | NODE ID |
|---|---|---|---|---|---|
| A001 | INDEX S | Ta001 | ADR_S(1) | NONE | NONE |
| A002 | INDEX S | Ta002 | ADR_S(2) | NONE | NONE |
| A003 | INDEX S | Ta003 | ADR_S(3) | NONE | NONE |
| ... | ... | ... | ... | ... | ... |
| A024 | INDEX S | Ta024 | ADR_S(24) | NONE | NONE |
| A029 | INDEX A2 | Ta029 | ADR_A2(1) | INVALID, INVALID, INVALID, INVALID, B025, B026, B027, B028 | INVALID, INVALID, INVALID, INVALID, EN_B, EN_B, EN_B, EN_B |

FIG. 26

| INDEX ID | INDEX | TIME STAMP | STORAGE POSITION | REFERENCE POINTER | NODE ID |
|---|---|---|---|---|---|
| B001 | INDEX T | Tb001 | ADR_T(1) | NONE | NONE |
| B002 | INDEX T | Tb002 | ADR_T(2) | NONE | NONE |
| B003 | INDEX T | Tb003 | ADR_T(3) | NONE | NONE |
| ... | ... | ... | ... | ... | ... |
| B024 | INDEX T | Tab024 | ADR_T(24) | NONE | NONE |
| B025 | INDEX B1 | Tab025 | ADR_B1(1) | B001, B002, ..., B006 | EN_B, EN_B, EN_B, EN_B, EN_B, EN_B |
| B026 | INDEX B1 | Tab026 | ADR_B1(2) | B007, B008, ..., B012 | EN_B, EN_B, EN_B, EN_B, EN_B, EN_B |
| B027 | INDEX B1 | Tab027 | ADR_B1(3) | B013, B014, ..., B018 | EN_B, EN_B, EN_B, EN_B, EN_B, EN_B |
| B028 | INDEX B1 | Tab028 | ADR_B1(3) | B019, B020, ..., B024 | EN_B, EN_B, EN_B, EN_B, EN_B, EN_B |
| B029 | INDEX B2 | Tab029 | ADR_B2(1) | INVALID, INVALID, INVALID, INVALID, B025, B026, B027, B028 | INVALID, INVALID, INVALID, INVALID, EN_B, EN_B, EN_B, EN_B |

FIG. 34

| INDEX ID | NODE ID | NUMBER OF TIMES OF REFERENCE |
|---|---|---|
| C101 | EN_C | 50 |
| C102 | EN_C | 1 |

FIG. 35

| INDEX ID | INDEX | TIME STAMP | STORAGE POSITION | REFERENCE POINTER | NODE ID | REFERENCE SOURCE NODE ID |
|---|---|---|---|---|---|---|
| ... | ... | ... | ... | ... | ... | ... |
| C100 | INDEX C | Tc100 | ADR_C(100) | C001, C002 | EN_C, EN_C | EN_D |
| C101 | INDEX C | Tc101 | ADR_C(101) | C003, C004 | EN_C, EN_C | NONE |
| C102 | INDEX C | Tc102 | ADR_C(102) | C005, C006 | EN_C, EN_C | NONE |
| ... | ... | ... | ... | ... | ... | ... |

DISTRIBUTED DATA MANAGEMENT PROGRAM, DISTRIBUTED DATA MANAGEMENT METHOD, AND DISTRIBUTED DATA MANAGEMENT APPARATUS

CROSS-REFERENCE TO RELATED APPLICATION

This application is based upon and claims the benefit of priority of the prior Japanese Patent Application No. 2017-101520, filed on May 23, 2017, the entire contents of which are incorporated herein by reference.

FIELD

The embodiments discussed herein are related to a technique for managing distributed data using an index.

BACKGROUND

For example, in a network system that manages distributed data by edge computing, an index of actual data to be distributed may be shared and held by a plurality of node devices.

In such a network system, in a case where the index is deleted by a certain node device, when an identifier of the deleted index is notified to another node device, useless operation in the other node device may be reduced.

However, there is a problem that when a notification is performed each time the index is deleted, a transmission load becomes large.

Japanese Laid-open Patent Publication No. 2011-118950 and Japanese Laid-open Patent Publication No. 9-6663 are examples of the related art.

As one aspect of the embodiment, provided are solutions for being able to alleviate a transmission load for notifying an identifier of a deleted index.

SUMMARY

According to an aspect of the invention, a distributed data management method performed by a distributed data management apparatus for holding a plurality of indexes which specify storage positions of data to be distributed in a network system, the method includes steps of: in a case where any one of the held indexes is deleted, adding an identifier of the deleted index to a first invalid list held by the distributed data management apparatus; and in a case where it is determined that an index requested from an information processing apparatus is not held, transmitting the first invalid list to the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a configuration example of a table of raw data;

FIG. 7 is a diagram illustrating a configuration example of an index table;

FIG. 9 is a diagram illustrating a configuration example of an index table;

FIG. 12 is a diagram illustrating a configuration example of a table of primary processed data;

FIG. 13 is a diagram illustrating a configuration example of an index table.

FIG. 15 is a diagram illustrating a configuration example of a table of primary processed data;

FIG. 18B is a diagram illustrating a sequence of secondary processing;

FIG. 20 is a diagram illustrating a configuration example of a table of secondary processed data;

FIG. 21 is a diagram illustrating a configuration example of an index table;

FIG. 22 is a diagram illustrating a configuration example of an index table;

FIG. 23 is a diagram illustrating a sequence of analysis;

FIG. 24 is a diagram illustrating a configuration example of an index table;

FIG. 26 is a diagram illustrating a configuration example of an index table;

FIG. 34 is a diagram illustrating an example of a reference counter table;

FIG. 35 is a diagram illustrating a configuration example of an index table according to Embodiment 2;

DESCRIPTION OF EMBODIMENTS

Embodiment 1

Figure 1:
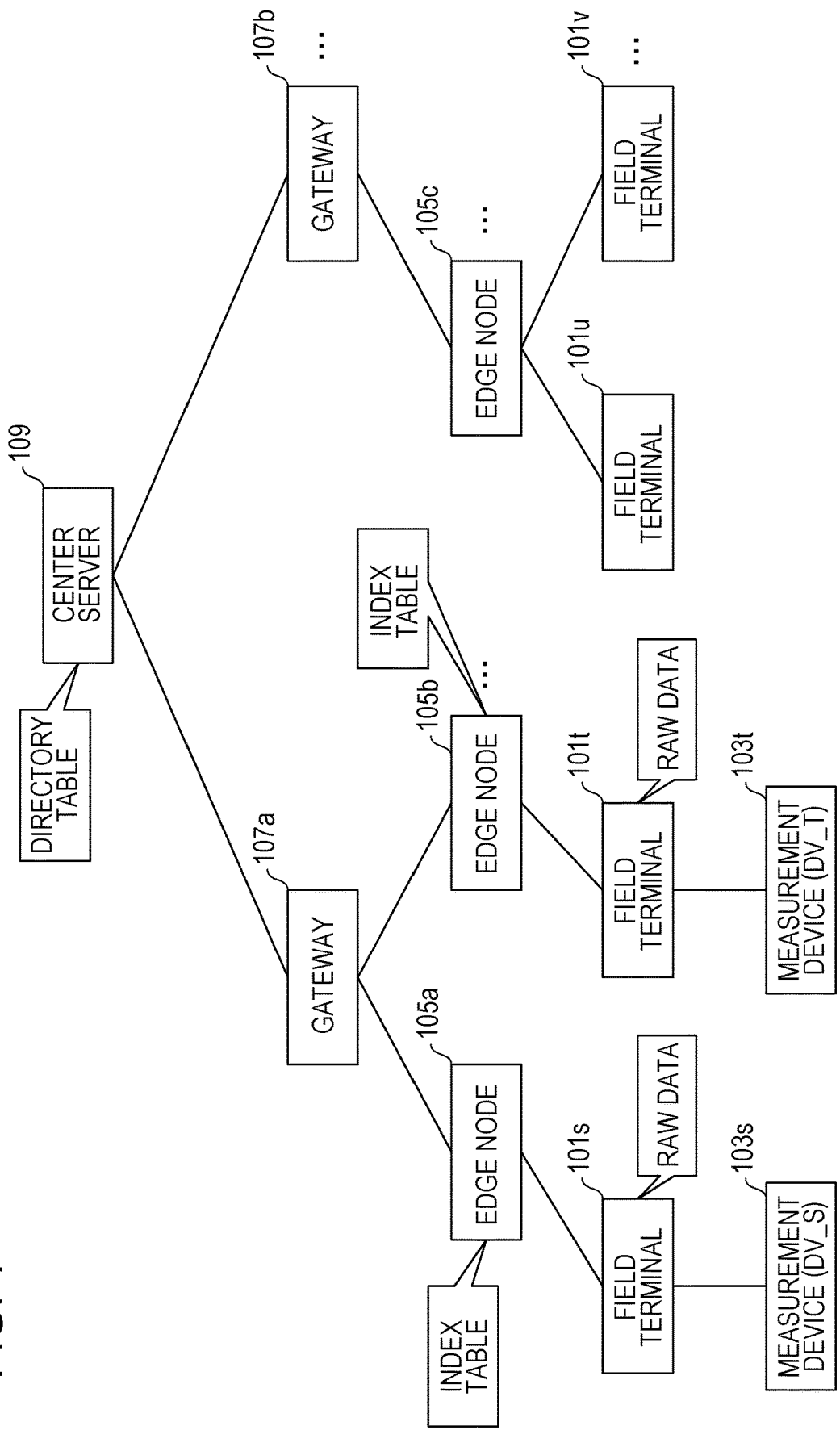
FIG. 1 is a diagram illustrating a configuration example of a network system.

FIG. 1 illustrates a configuration example of a network system. In this example, the network system manages distributed data in edge computing. Specifically, a field terminal 101 holds data measured by a measurement device 103, that is, raw data. An index relating to raw data is sent from the field terminal 101 to an edge node 105. The index includes, for example, information on a type and a storage position of the raw data.

The edge node 105 manages the received index by using a table (hereinafter, referred to as index table). By referencing this index table, it becomes possible to know what data is located where. In Embodiment 1, attention is paid to a point that the edge node 105 manages the index.

A center server 109 is connected to the edge node 105 via a gateway 107. The center server 109 collects indexes from the edge node 105 and manages the entire index using a directory table. However, in Embodiment 1, attention is not paid to the directory table.

In this example, it is assumed that a temperature and a humidity measured at intervals of one hour by a measurement device 103s (identifier: DV_S) are held in a field terminal 101s as raw data. Similarly, it is assumed that the temperature and the humidity measured at intervals of one hour by a measurement device 103t (identifier: DV_T) are held in a field terminal 101t as raw data.

Figure 2:
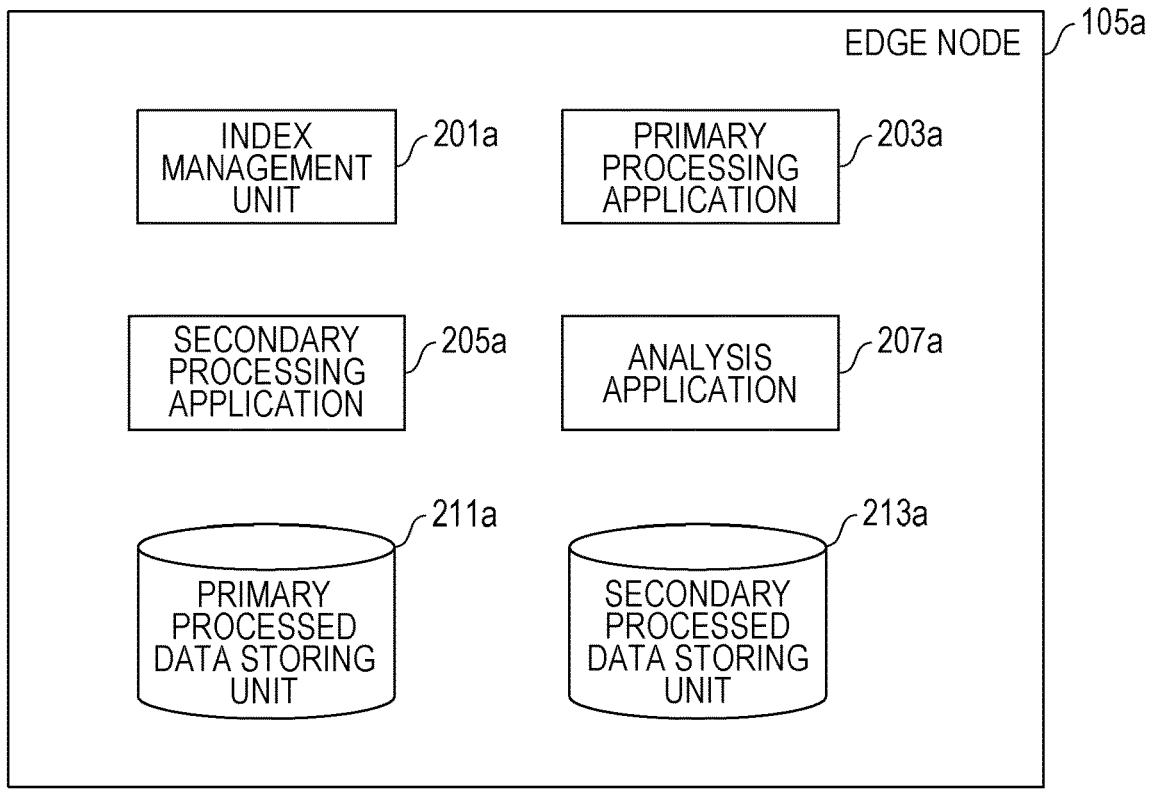
FIG. 2 is a diagram illustrating a module configuration example of an edge node.

FIG. 2 illustrates a module configuration example of an edge node 105a. The edge node 105a includes an index management unit 201a, a primary processing application 203a, a secondary processing application 205a, an analysis application 207a, a primary processed data storing unit 211a, and a secondary processed data storing unit 213a.

The index management unit 201a manages an index relating to underlying raw data. The primary processing application 203a collects the raw data, processes the collected raw data, and generates primary processed data. In this example, measured data of the temperature and the humidity are collected and an average temperature and an average humidity in a period of six hours are calculated. That is, the primary processed data is generated referring to the raw data.

The secondary processing application 205a calculates an average daily temperature based on the primary processed data generated by the edge node 105a and an edge node 105b. That is, secondary processed data is generated by referring to the primary processed data.

The analysis application 207a collects the primary processed data which is the basis of secondary processed data of interest and performs analysis on the average temperature. The primary processed data storing unit 211a stores the primary processed data generated by the primary processing application 203a. The secondary processed data storing unit 213a stores the secondary processed data generated by the secondary processing application 205a.

The index management unit 201a described above is realized by using hardware resources (for example, FIG. 40) and a program for causing a processor to execute a process described below.

Figure 40:
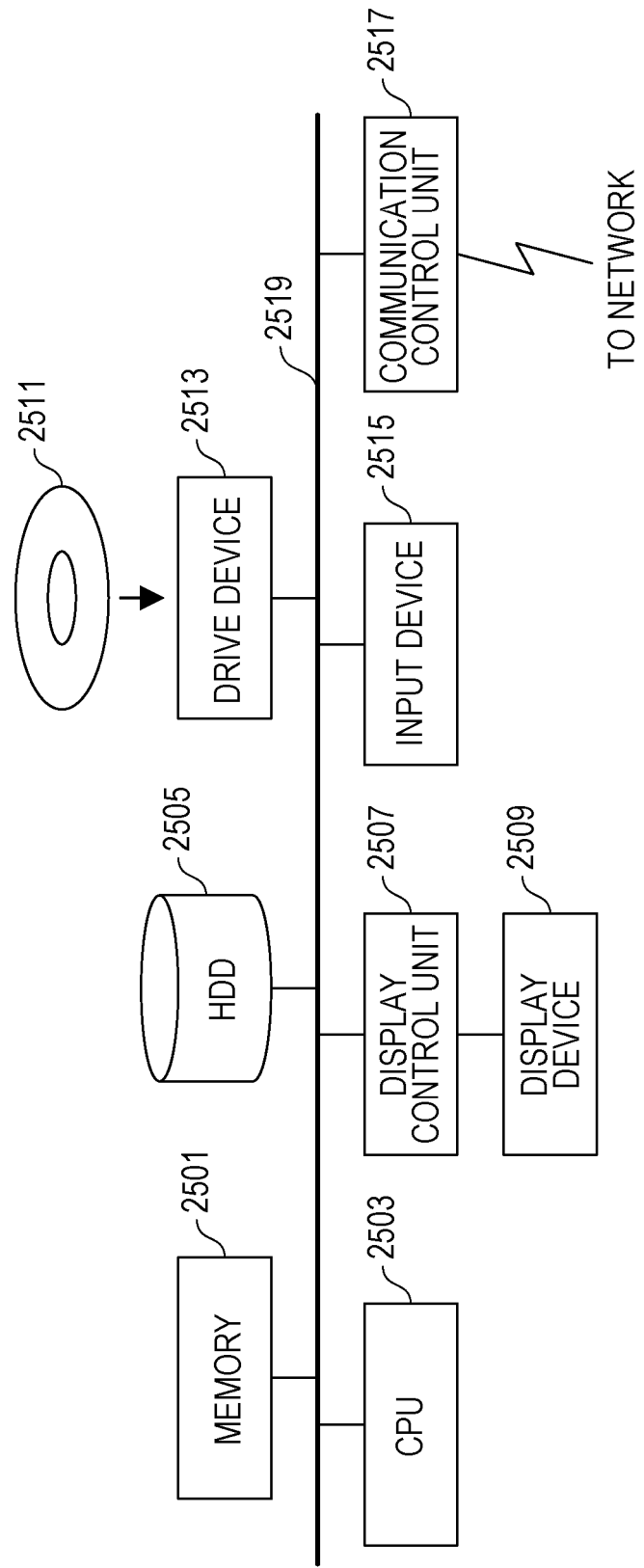
FIG. 40 is a functional block diagram of a computer.

The primary processed data storing unit 211a and secondary processed data storing unit 213a described above are realized by using hardware resources (for example, FIG. 40).

Figure 3:
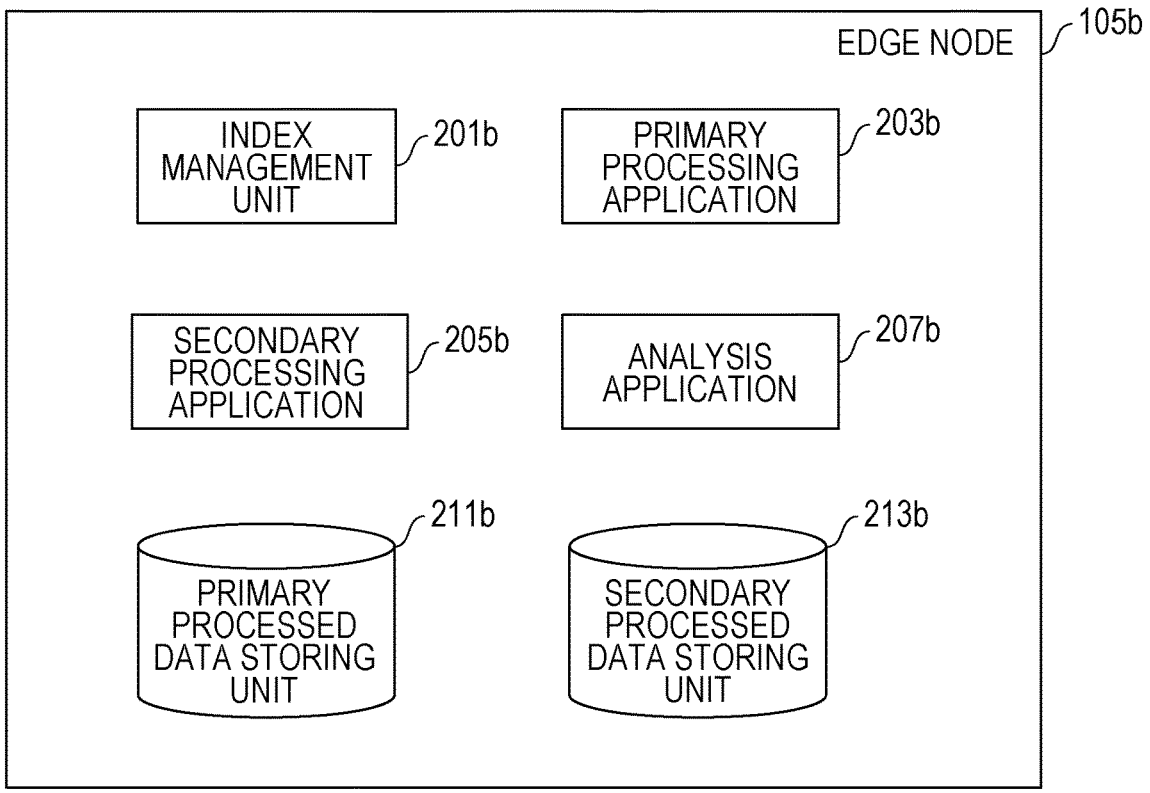
FIG. 3 is a diagram illustrating a module configuration example of an edge node.

Subsequently, a module configuration example of the edge node 105b will be described with reference to FIG. 3. The edge node 105b includes an index management unit 201b, a primary processing application 203b, a secondary processing application 205b, an analysis application 207b, a primary processed data storing unit 211b, and a secondary processed data storing unit 213b.

The index management unit 201b is similar to the index management unit 201a. The primary processing application 203b is similar to the primary processing application 203a.

The secondary processing application 205b calculates an average daily humidity based on the primary processed data generated by the edge node 105a and the edge node 105b. The analysis application 207b collects the primary processed data which is the basis of the secondary processed data of interest and performs analysis on average humidity.

The primary processed data storing unit 211b stores the primary processed data generated by the primary processing application 203b. The secondary processed data storing unit 213b stores the secondary processed data generated by the secondary processing application 205b.

The index management unit 201b described above is realized by using hardware resources (for example, FIG. 40) and a program for causing a processor to execute the processing described below.

The primary processed data storing unit 211b and the secondary processed data storing unit 213b described above are realized by using hardware resources (for example, FIG. 40).

Figure 4:
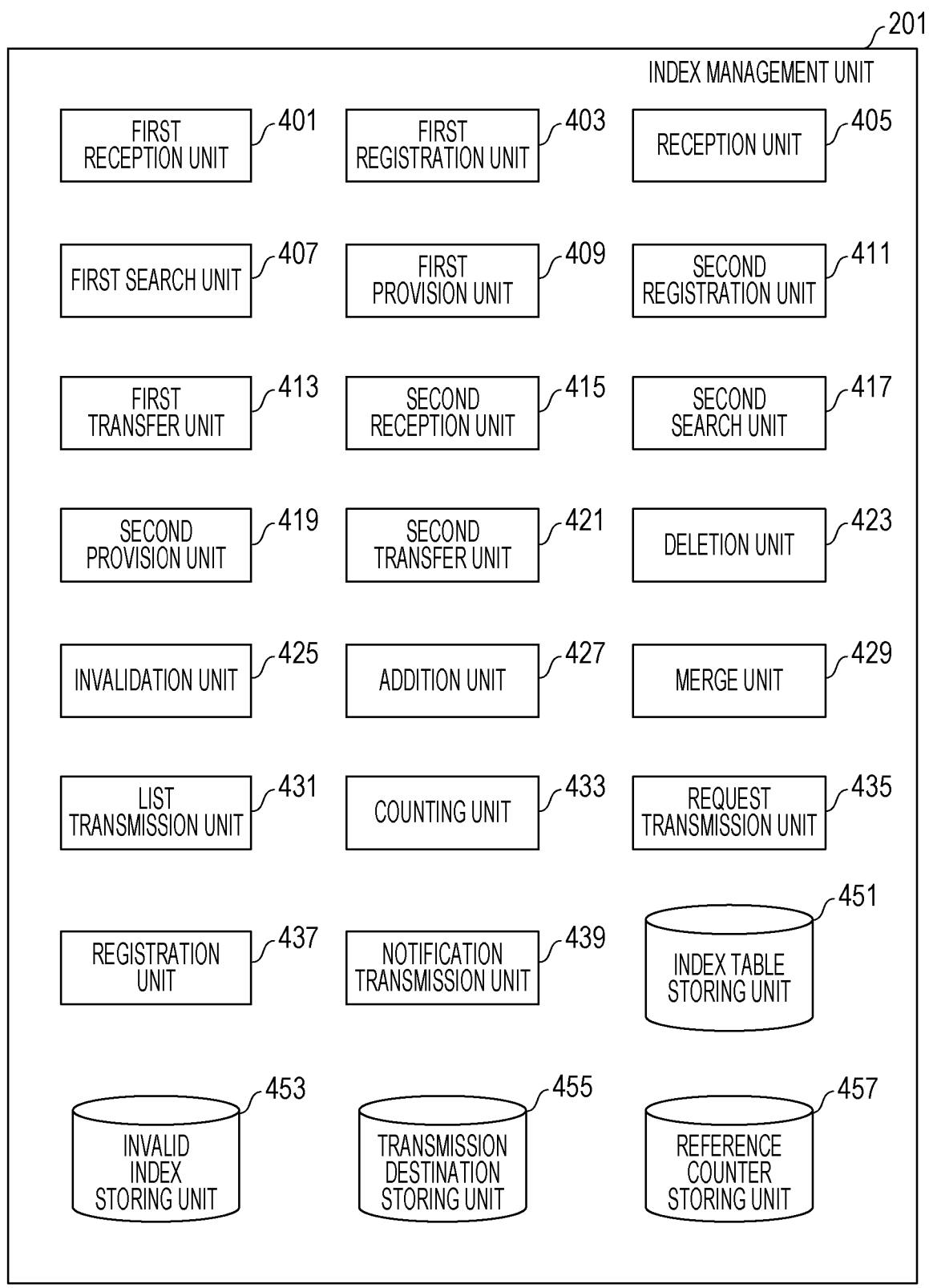
FIG. 4 is a diagram illustrating a module configuration example of an index management unit.

FIG. 4 illustrates a module configuration example of an index management unit 201. A brief description of each module is given here. Details thereof will be described later. The index management unit 201 includes a first reception unit 401, a first registration unit 403, a reception unit 405, a first search unit 407, a first provision unit 409, and a second registration unit 411.

The first reception unit 401 receives an index registration request. The first registration unit 403 executes an index registration process (A). The reception unit 405 receives, for example, a request from an application in the edge node 105. The first search unit 407 searches for an index record matching a search condition in response to a request from the inside of the edge node 105. The first provision unit 409 provides an index in response to an acquisition request from the inside of the edge node 105. The second registration unit 411 executes an index registration process (B).

The first reception unit 401, the first registration unit 403, the reception unit 405, the first search unit 407, the first provision unit 409, and the second registration unit 411 are realized by using hardware resources (for example, FIG. 40) and a program for causing the processor to execute the process described below.

The index management unit 201 further includes a first transfer unit 413, a second reception unit 415, a second search unit 417, a second provision unit 419, a second transfer unit 421, a deletion unit 423, an invalidation unit 425, an addition unit 427, a merge unit 429, and a list transmission unit 431.

The first transfer unit 413 transfers the index search condition. The second reception unit 415 receives various pieces of data from the index management unit 201 in other edge nodes 105. The second search unit 417 searches for an index matching the search condition in response to a request from an external device. The second provision unit 419 provides an index in response to an acquisition request from an external device. The second transfer unit 421 transfers, for example, an index acquisition request. The deletion unit 423 deletes the index. The invalidation unit 425 invalidates an index ID set in a reference pointer and a node ID corresponding to the index ID. The addition unit 427 adds the index ID to the invalid index list. The merge unit 429 merges two invalid index lists. The list transmission unit 431 transmits an invalid index list.

The first transfer unit 413, the second reception unit 415, the second search unit 417, the second provision unit 419, the second transfer unit 421, the deletion unit 423, the invalidation unit 425, the addition unit 427, the merge unit 429, and the list The transmission unit 431 described above are is realized by using hardware resources (for example, FIG. 40) and a program for causing the processor to execute the process described below.

The index management unit 201 further includes a counting unit 433, a request transmission unit 435, a registration unit 437, and a notification transmission unit 439.

The counting unit 433 counts the number of times of reference of the index. The request transmission unit 435 transmits a registration request of a reference source. The registration unit 437 registers the reference source of the index. The notification transmission unit 439 transmits an invalid index notification.

The counting unit 433, the request transmission unit 435, the registration unit 437, and the notification transmission unit 439 are realized by using hardware resources (for example, FIG. 40) and a program for causing the processor to execute the process described below.

The index management unit 201 further includes an index table storing unit 451, an invalid index storing unit 453, a transmission destination storing unit 455, and a reference counter storing unit 457.

The index table storing unit 451 stores an index table. The invalid index storing unit 453 stores an invalid index list. A transmission destination storing unit 455 stores a transmission destination list. The reference counter storing unit 457 stores a reference counter table.

The index table storing unit 451, the invalid index storing unit 453, the transmission destination storing unit 455, and the reference counter storing unit 457 are realized by using hardware resources (for example, FIG. 40).

First, a sequence of index collection will be described with reference to FIG. 5. The field terminal 101s measures the temperature and the humidity using the measurement device 103s at the predetermined timing (interval of one hour in this example) (S501) and stores measured raw data in its own storing unit (S503).

FIG. 6 illustrates a configuration example of a table of raw data. It is assumed that the position of the table of raw data in the field terminal 101s is specified by an address ADR_S. The table of raw data in this example has a record corresponding to the measurement timing.

The record in the table of raw data in this example has a field in which temperature is stored, a field in which humidity is stored, and a field in which date and time is stored. The date and time specifies the point in time of measurement.

Figure 5:
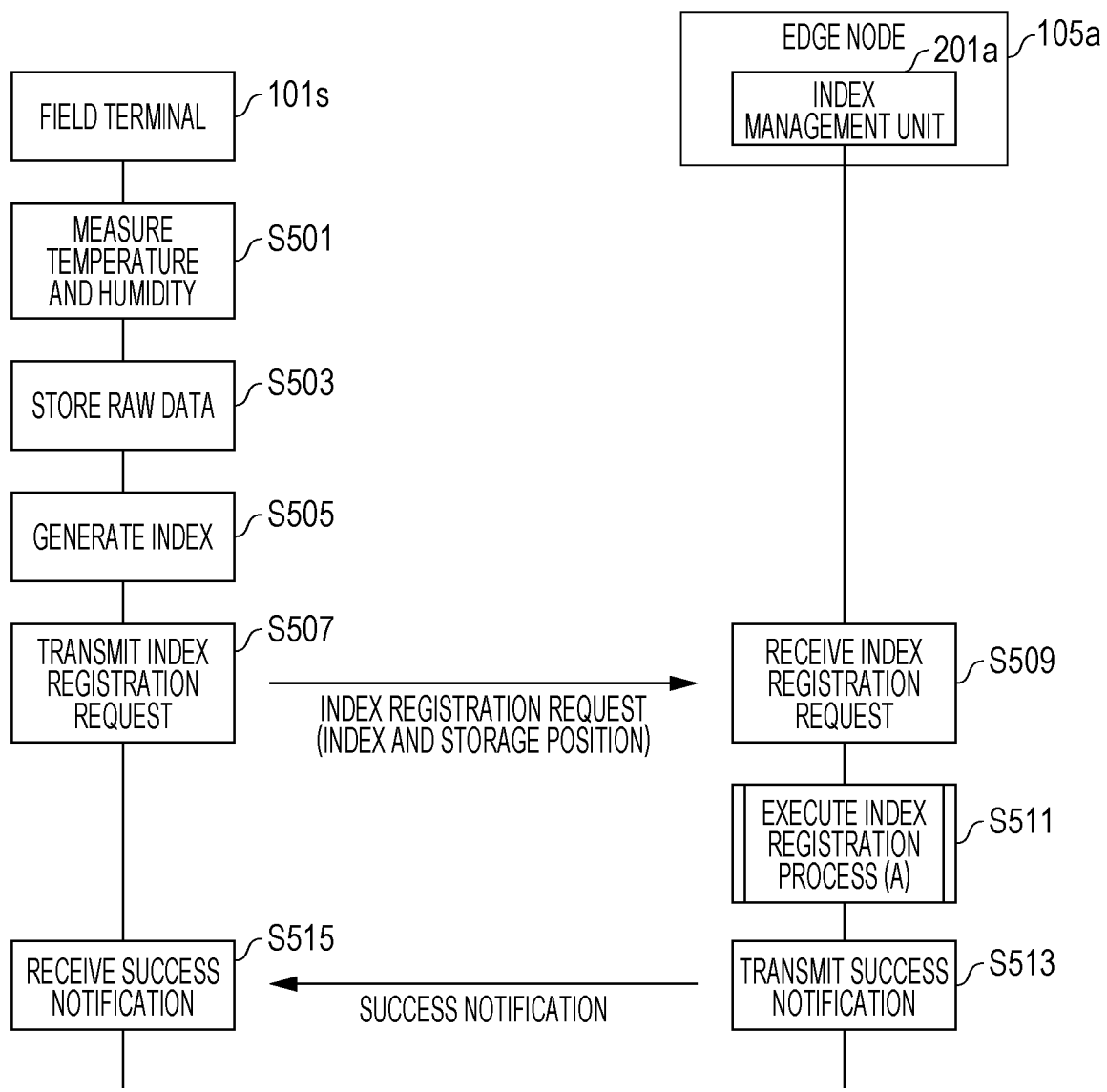
FIG. 5 is a diagram illustrating a sequence of index collection.

Referring back to the description of FIG. 5, the field terminal 101s generates an index relating to stored raw data (S505). An index S generated in this example is {data item name: [temperature, humidity, date and time], interval: one hour, data characteristic: measured value}. Then, the field terminal 101s transmits an index registration request to the edge node 105a (S507). The index registration request includes the index and a storage position of raw data.

When the first reception unit 401 in the index management unit 201a of the edge node 105a receives the index registration request (S509), the first registration unit 403 in the index management unit 201a of the edge node 105a executes the index registration process (A) (S511).

In the index registration process (A), the index is registered in the index table. A configuration example of the index table will be described with reference to FIG. 7. FIG. 7 illustrates an example of the index table stored in the edge node 105a of which the node ID is EN_A.

The index table in this example has a record (hereinafter, referred to as an index record) corresponding to the index. The index record includes a field in which an index ID is stored, a field in which an index is stored, a field in which a time stamp is stored, a field in which a storage position is stored, a field in which a reference pointer is stored, and a field in which a node ID is stored.

The index ID identifies the index. The time stamp specifies the point in time when the index is registered. The storage position specifies a location where raw data is stored. In the reference pointer, an ID of the index of data which is the basis of processing is set, in the index indicating the storage position of processed data instead of raw data. The node ID specifies a node device holding the index specified by the reference pointer.

Figure 8:
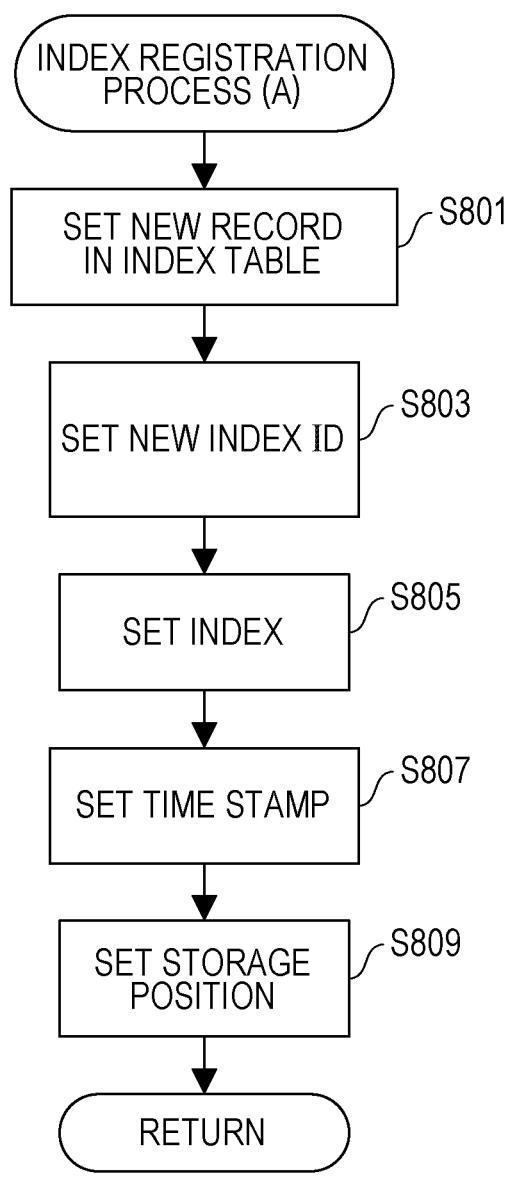
FIG. 8 is a diagram illustrating a flow of an index registration process (A)

Subsequently, the index registration process (A) will be described with reference to FIG. 8. For example, the first registration unit 403 in the index management unit 201a of the edge node 105a executes processing along the flow. The first registration unit 403 sets a new record in the index table (S801). The first registration unit 403 sets a new index ID in the record (S803). The first registration unit 403 sets an index included in the index registration request in the record (S805).

The first registration unit 403 sets the current day date and the current time in the field of the time stamp of the record (S807). Then, the first registration unit 403 sets the storage position included in the index registration request in the record (S809). When the index registration process (A) is ended, the process returns to the processing of a caller.

Referring back to the description of FIG. 5, when the index registration process (A) is ended, the first registration unit 403 in the index management unit 201a of the edge node 105a transmits a success notification to the terminal 101s which is a request source (S513).

The field terminal 101s receives the success notification (S515), and a series of processes ends.

Similarly as in the case of the field terminal 101s, the field terminal 101t also measures temperature and humidity and holds measured data, that is, raw data. Then, the edge node 105b registers an index sent from the field terminal 101t in the index table.

FIG. 9 illustrates a configuration example of an index table in the edge node 105b. FIG. 9 illustrates an example of the index table stored in the edge node 105b of which the node ID is EN_B. The configuration of the index table illustrated in FIG. 9 is similar to that in the case of FIG. 7. Similarly as in the case of the index S, the index T sent from the field terminal 101t is {data item name: [temperature, humidity, date and time], interval: 1 hour, data characteristic: measured value}.

Figure 10:
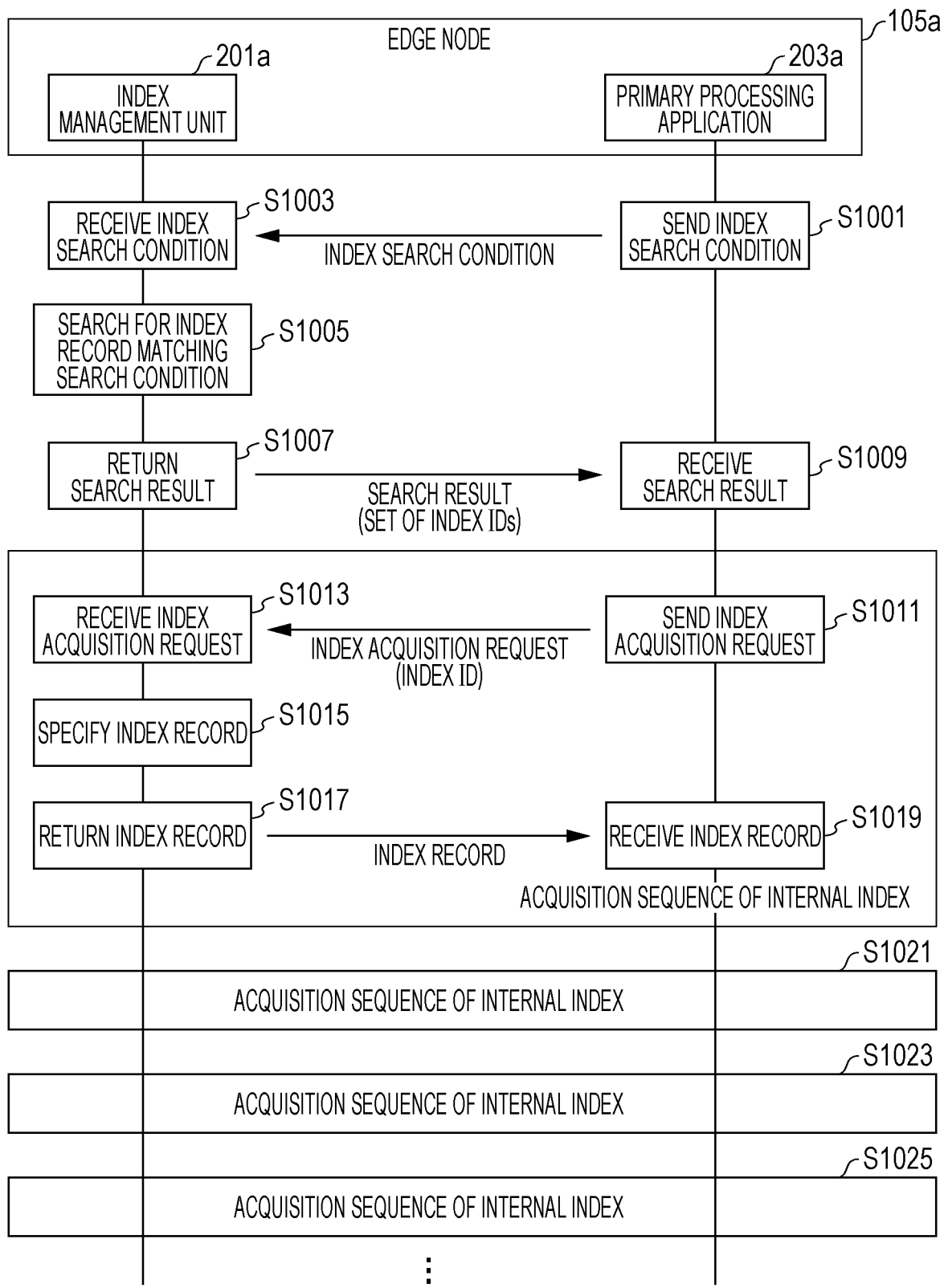
FIG. 10 is a diagram illustrating a sequence of primary processing.

Next, a sequence in a case where primary processing of data is performed in the primary processing application 203a of the edge node 105a will be described. FIG. 10 illustrates a sequence of primary processing.

First, the primary processing application 203a of the edge node 105a sends an index search condition to the index management unit 201a of the edge node 105a (S1001). The index search condition in this example is that the data item name includes "temperature" and "humidity", the data characteristic is "measured value", and the time stamp is a target period (for example, period from 00:00:00 of 2017 Apr. 1 to 06:00:00 of the same day).

When the reception unit 405 in the index management unit 201a of the edge node 105a receives the index search condition (S1003), the first search unit 407 in the index management unit 201a of the edge node 105a searches for an index record matching the search condition (S1005). Then, the first search unit 407 in the index management unit 201a of the edge node 105a returns a search result to the primary processing application 203a of the edge node 105a which is a request source (S1007). The search result includes an ID of the index found by the search. That is, when a plurality of indexes are found out, a set of index IDs are included.

When the primary processing application 203a of the edge node 105a receives the search result (S1009), the primary processing application 203a proceeds to an internal index acquisition sequence.

In the internal index acquisition sequence, first, the primary processing application 203a of the edge node 105a sends an index acquisition request to the index management unit 201a (S1011). The index acquisition request includes one index ID specified by the search result. That is, in this example, indexes are acquired one by one. However, it is also possible to acquire a plurality of multiple indexes collectively.

When the reception unit 405 in the index management unit 201a of the edge node 105a receives the index acquisition request (S1013), the first provision unit 409 in the index management unit 201a of the edge node 105a specifies an index record corresponding to the index ID included in the index acquisition request (S1015). The first provision unit 409 in the index management unit 201a of the edge node 105a returns an index record to the primary processing application 203a which is a request source (S1017).

Then, the primary processing application 203a of the edge node 105a receives the index record (S1019).

Such an internal index acquisition sequence is repeated for each index ID included in the search result (S1021 to S1025).

Thereafter, the primary processing application 203a of the edge node 105a reads a storage position of raw data from the acquired index, accesses the storage position, and reads the raw data. In this example, the raw data is read from the field terminal 101s.

Figure 11:
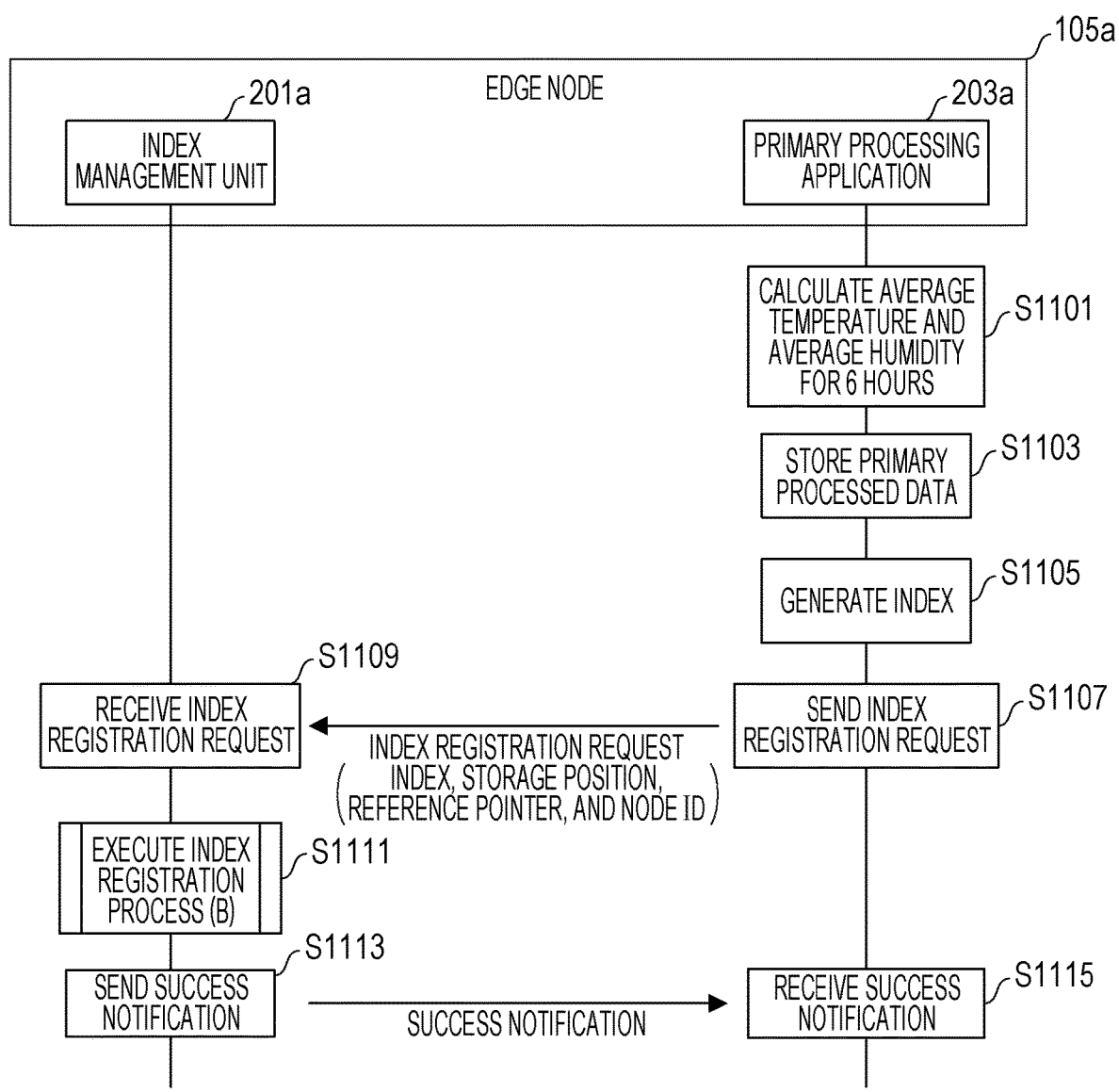
FIG. 11 is a diagram illustrating a sequence of primary processing.

FIG. 11 illustrates a sequence after raw data acquisition. The primary processing application 203a of the edge node 105a calculates average temperature and average humidity for 6 hours based on acquired raw data (S1101). The primary processing application 203a of the edge node 105a stores primary processed data in a table provided in the primary processed data storing unit 211a of the edge node 105a (S1103).

FIG. 12 illustrates a configuration example of a table of primary processed data. The table of primary processed data is stored in the primary processed data storing unit 211a. The storage position of the table of primary processed data is specified by an address ADR_A1.

The table of primary processed data in this example has records corresponding to the primary processed data. The record in the table of primary processed data has a field in which temperature is stored, a field in which humidity is stored, and a field in which date and time is stored. The average humidity is stored in the humidity field. The date and time specifies the central point in time of a target period.

Referring back to the description of FIG. 11, the primary processing application 203a of the edge node 105a generates an index of the primary processed data (S1105). The index A1 generated in this example is {data item name: [temperature, humidity, date and time], interval: six hours, data characteristics: average value}. The primary processing application 203a of the edge node 105a sends an index registration request to the index management unit 201a of the edge node 105a (S1107). The index registration request sent at this time includes an index, a storage position of the primary processed data, a reference pointer, and a node ID. The reference pointer is an ID of the index related to the raw data which is the basis of generation of the primary processed data. The node ID specifies a node (in this example, the edge node 105) which holds the index table including the index related to the index ID.

When the reception unit 405 in the index management unit 201a of the edge node 105a receives an index registration request (S1109), the second registration unit 411 in the index management unit 201a of the edge node 105a executes an index registration process (B) (S1111).

FIG. 13 illustrates an example of an index table to which records are added by the index registration process (B). In this example, records of which index IDs are A025 to A028 are added. The reference pointers and the node IDs in the same order correspond to each other. That is, an N-th reference pointer and an N-th node ID are combined.

Figure 14:
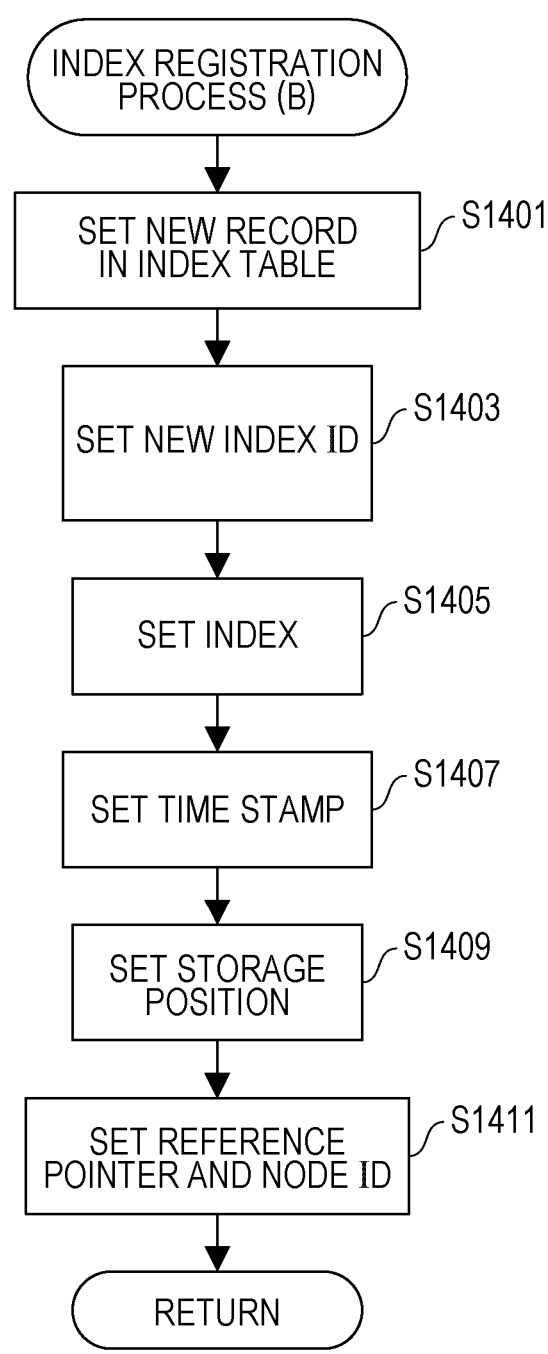
FIG. 14 is a diagram illustrating a flow of an index registration process (B)

Subsequently, the index registration process (B) will be described with reference to FIG. 14. The second registration unit 411 in the index management unit 201a of the edge node 105a executes a processing along the flow of the index registration process (B). The second registration unit 411 sets a new record in the index table (S1401). The second registration unit 411 sets a new index ID in the record (S1403). The second registration unit 411 sets an index included in the index registration request in the record (S1405).

The second registration unit 411 sets the current day date and current time in the field of the time stamp of the record (S1407). The second registration unit 411 sets the storage position included in the index registration request in the record (S1409).

The second registration unit 411 further sets a reference pointer and a node ID included in the index registration request in the record (S1411). When the index registration process (B) is ended, the process returns to a process of a caller.

Referring back to the description of FIG. 11, the second registration unit 411 in the index management unit 201a of the edge node 105a sends a success notification to the primary processing application 203a of the edge node 105a which is a request source (S1113).

When the primary processing application 203a of the edge node 105a receives the success notification (S1115), a series of processes ends.

Also, in the edge node 105b, primary processed data (in this example, average temperature and average humidity) is calculated for raw data held in the field terminal 101t according to the same primary processing sequence.

The table of the primary processed data in the edge node 105b is stored in the primary processed data storing unit 211b. It is assumed that the storage position of the table of primary processed data is specified by an address ADR_B1.

In the edge node 105b, as illustrated in FIG. 15, an index record relating to primary processed data is added. In this example, records of which index IDs are B025 to B028 are added.

Figure 16:
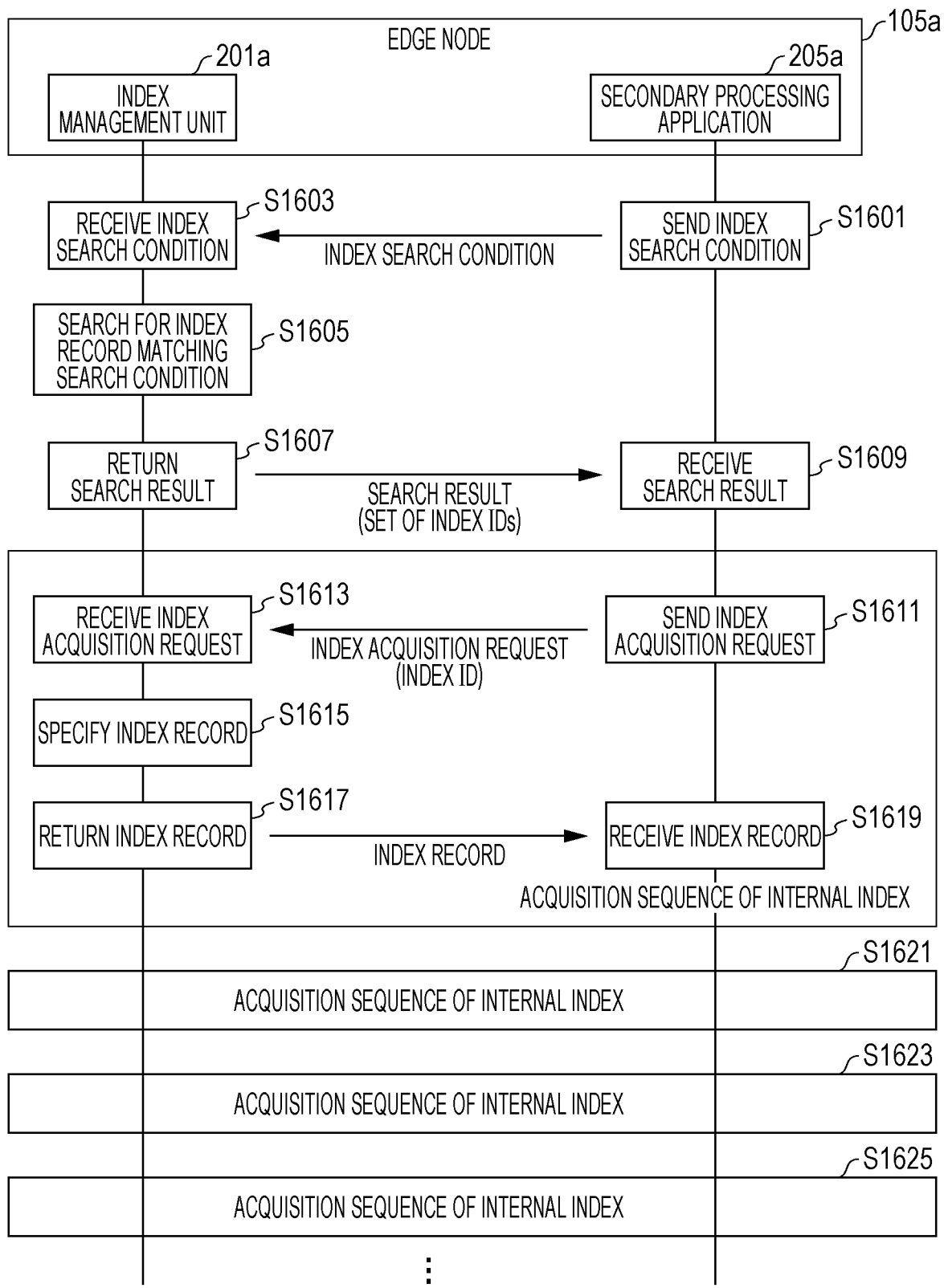
FIG. 16 is a diagram illustrating a sequence of secondary processing.

Next, a sequence in a case where secondary processing of data is performed in the secondary processing application 205a of the edge node 105a will be described. FIG. 16 illustrates a sequence of secondary processing.

The secondary processing application 205a of the edge node 105a sends an index search condition to the index management unit 201a of the edge node 105a (S1601). The index search condition in this example is that the data item name includes "temperature", the interval is "six hours", the data characteristic is "average value", and the time stamp is an index included in a target period (for example, period from 00:00:00 of 2017 Apr. 1 to 00:00:00 of 2017 Apr. 2).

When the reception unit 405 in the index management unit 201a of the edge node 105a receives the index search condition (S1603), the first search unit 407 in the index management unit 201a of the edge node 105a searches for an index record matching the search condition (S1605). Then, the first search unit 407 in the index management unit 201a of the edge node 105a returns the search result to the secondary processing application 205a of the edge node 105a which is a request source (S1607). The search result includes the ID of the index held internally.

When the primary processing application 203a of the edge node 105a receives the search result (S1609), the secondary processing application 205a proceeds to an acquisition sequence of the internal index.

In the internal index acquisition sequence, first, the secondary processing application 205a of the edge node 105a sends an index acquisition request to the index management unit 201a (S1611). The index acquisition request includes the index ID specified by the search result.

When the reception unit 405 in the index management unit 201a of the edge node 105a receives the index acquisition request (S1613), the first provision unit 409 in the index management unit 201a of the edge node 105a specifies an index record corresponding to the index ID included in the index acquisition request (S1615). The first provision unit 409 in the index management unit 201a of the edge node 105a returns an index record to the secondary processing application 205a which is a request source (S1617).

Then, the secondary processing application 205a of the edge node 105a receives the index record (S1619). Such an internal index acquisition sequence is repeated for each index ID included in the search result (S1621 to S1625).

Subsequently, the secondary processing application 205a of the edge node 105a reads a storage position of the primary processed data from each acquired index, accesses the storage position, and sequentially reads primary processed data. In this example, the primary processed data is read from the primary processed data storing unit 211a of the edge node 105a.

Figure 17:
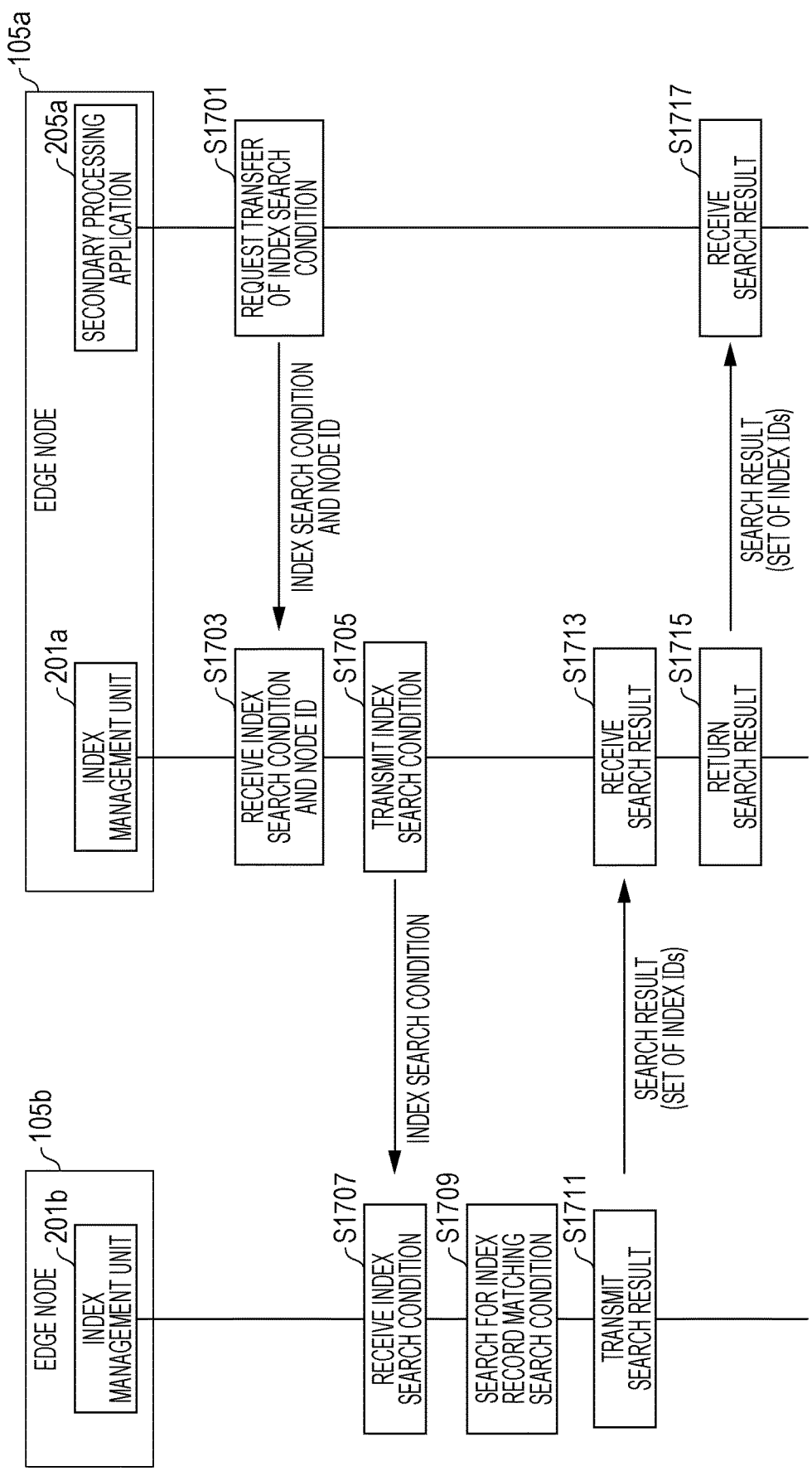
FIG. 17 is a diagram illustrating a sequence of secondary processing.

Thereafter, as illustrated in FIG. 17, the secondary processing application 205a of the edge node 105a proceeds to a process for acquiring the index held by the index management unit 201b of the edge node 105b.

The secondary processing application 205a of the edge node 105a requests the index management unit 201a of the edge node 105a to transfer an index search condition (S1701). The index search condition is the same as in the case of FIG. 16. In this case, a node ID specifying a transfer destination is also delivered to the index management unit 201a of the edge node 105a. In this example, the node ID "EN_B" of the edge node 105b is delivered.

When the reception unit 405 in the index management unit 201a of the edge node 105a receives the index search condition and the node ID (S1703), the first transfer unit 413 in the index management unit 201a of the edge node 105a transmits the search condition of the relevant index to the index management unit 201 of the node specified by the node ID (S1705). The transmission destination in this example is the index management unit 201b of the edge node 105b.

When the second reception unit 415 in the index management unit 201b of the edge node 105b receives the index search condition (S1707), the second search unit 417 in the index management unit 201b of the edge node 105b searches for an index record matching the search condition (S1709). Then, the second search unit 417 in the index management unit 201b of the edge node 105b transmits a search result to the index management unit 201a of the edge node 105a (S1711). As described above, the search result includes the ID of the index found by the search.

When the second reception unit 415 in the index management unit 201a of the edge node 105a receives the search result (S1713), the first transfer unit 413 in the index management unit 201a of the edge node 105a returns the search result to the secondary processing application 205a of the edge node 105a which is a request source (S1715).

Figure 18A:
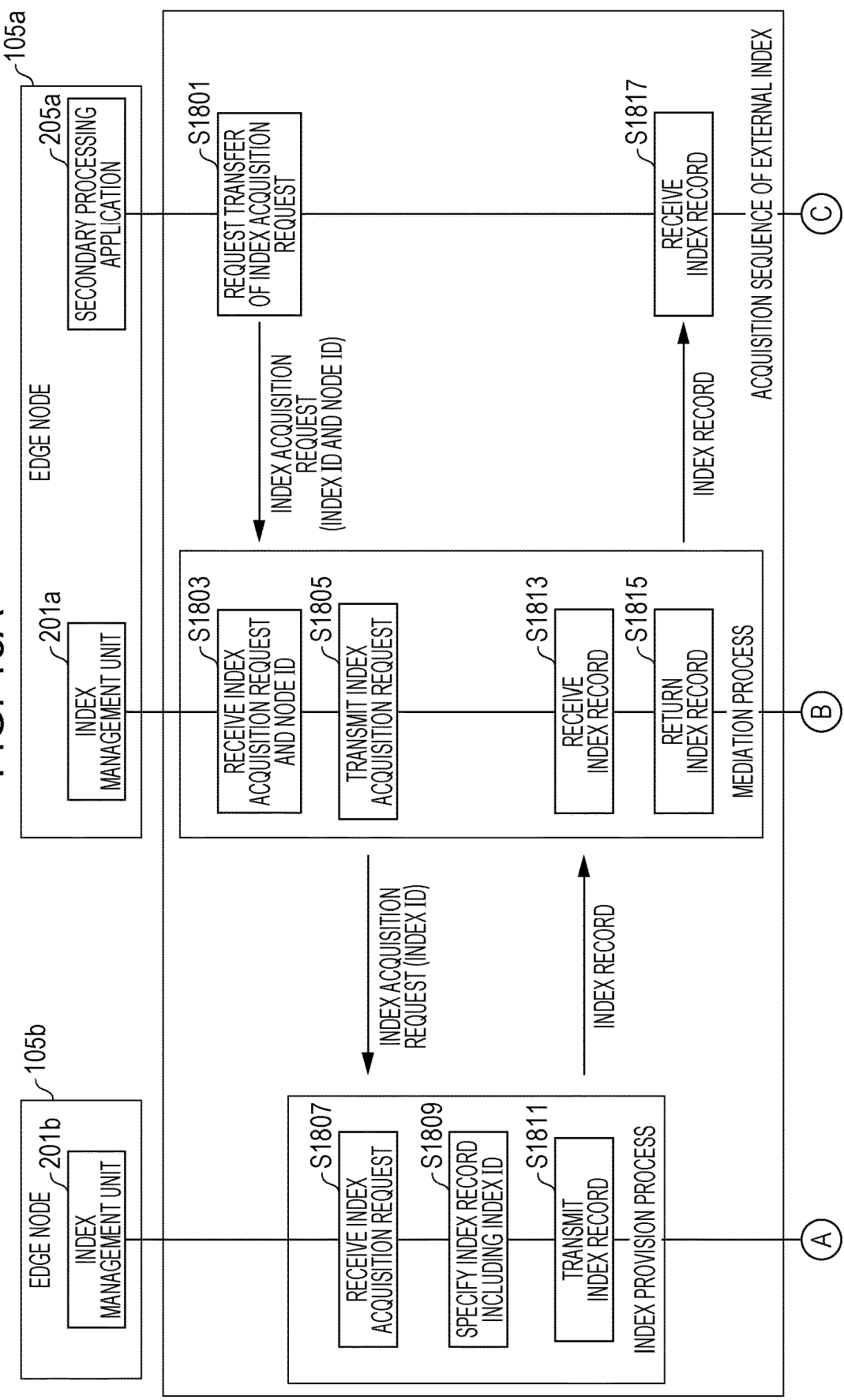
FIG. 18A is a diagram illustrating a sequence of secondary processing.

When the secondary processing application 205a of the edge node 105a receives the search result (S1717), it shifts to an acquisition sequence of an external index illustrated in FIG. 18A.

In the external index acquisition sequence, the secondary processing application 205a of the edge node 105a requests the index management unit 201a of the edge node 105a to transfer an index acquisition request (S1801). In this case, the acquisition request of the index including the index ID and the node ID specifying the transfer destination are delivered to the index management unit 201a of the edge node 105a. In this example, the node ID "EN_B" of the edge node 105b is delivered.

When the reception unit 405 in the index management unit 201a of the edge node 105a receives the index acquisition request and the node ID (S1803), the second transfer unit 421 in the index management unit 201a of the edge node 105a transmits the index acquisition request to the index management unit 201 of the node specified by the ID (S1805).

When the second reception unit 415 in the index management unit 201b of the edge node 105b receives the index acquisition request (S1807), the second provision unit 419 in the index management unit 201b of the edge node 105b specifies an index record in which an index ID included in the index acquisition request is set (S1809). Then, the second provision unit 419 in the index management unit 201b of the edge node 105b transmits a specified index record to the index management unit 201a of the edge node 105a which is a request source (S1811).

When the second reception unit 415 in the index management unit 201a of the edge node 105a receives an index record (S1813), the second transfer unit 421 in the index management unit 201a of the edge node 105a returns the index record to the secondary processing application 205a of the edge node 105a which is a request source (S1815).

Then, the secondary processing application 205a of the edge node 105a receives the index record (S1817). Thereafter, the secondary processing application 205a proceeds to FIG. 18B through a terminal A, a terminal B, and a terminal C.

Such an external index acquisition sequence is repeated for each index ID included in the search result (S1819 to S1823).

Thereafter, the secondary processing application 205a of the edge node 105a reads a storage position of the primary processed data from the acquired index, accesses the storage position, and reads primary processed data. In this example, the primary processed data is read from the primary processed data storing unit 211b of the edge node 105b.

Figure 19:
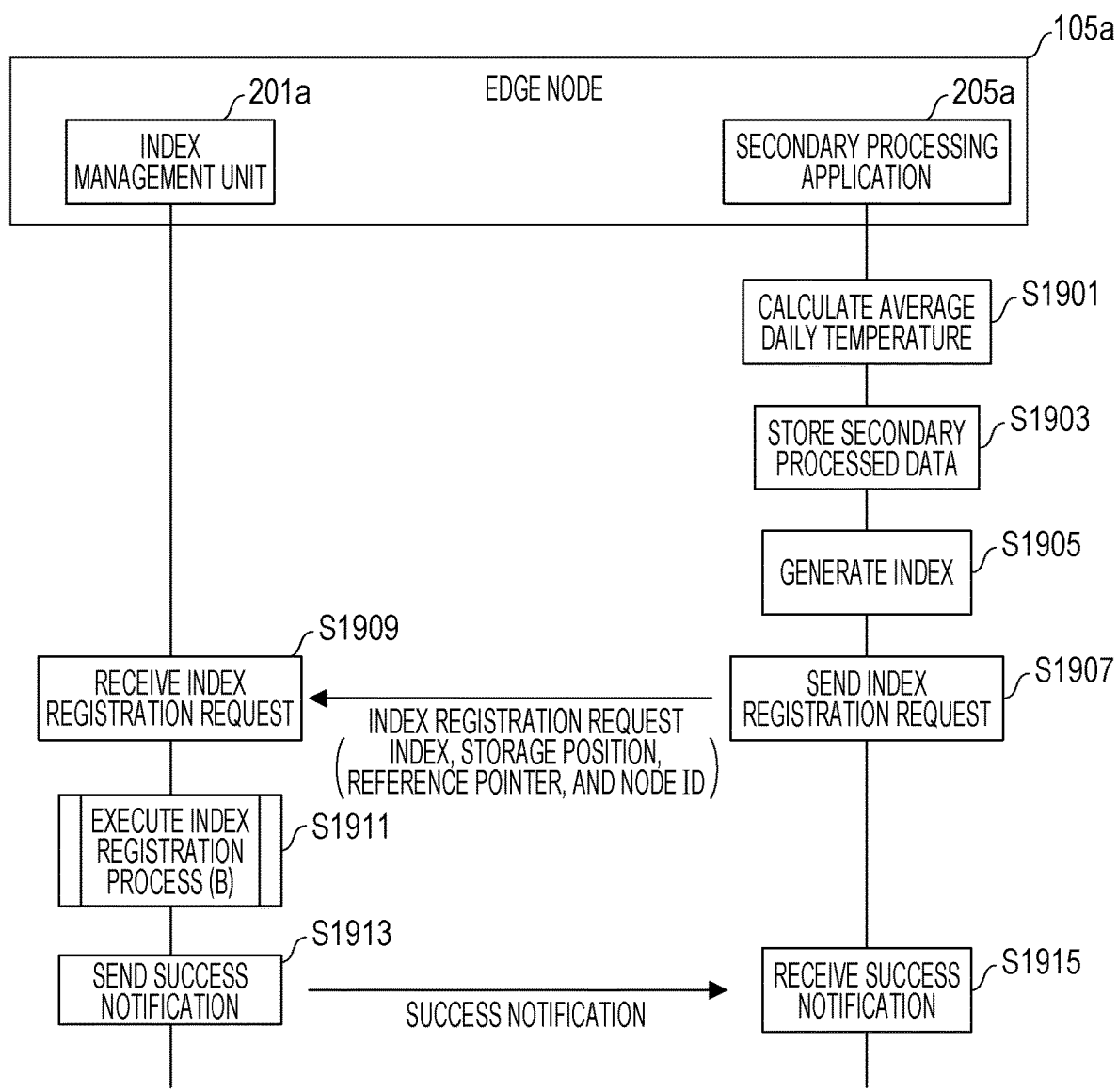
FIG. 19 is a diagram illustrating a sequence of secondary processing.

FIG. 19 illustrates a subsequent sequence. The secondary processing application 205a of the edge node 105a calculates average daily temperature based on the acquired primary processed data (S1901). The secondary processing application 205a of the edge node 105a stores secondary processed data in a table provided in the secondary processed data storing unit 213a of the edge node 105a (S1903).

FIG. 20 illustrates a configuration example of a table of secondary processed data. The table of secondary processed data is stored in the secondary processed data storing unit 213a. A storage position of the table of the secondary processed data is specified by an address ADR_A2.

The table of secondary processed data in this example has a record corresponding to the table of the secondary processed data. The record in the table of secondary processed data has a field in which the temperature is stored and a field in which the date and time is stored. The average daily temperature is stored in the field where the temperature is stored. The date and time specifies the central point in time of a target period.

Referring back to the description of FIG. 19, the secondary processing application 205a of the edge node 105a generates an index (S1905). The index A2 generated in this example is {data item name: [temperature, date and time], interval: one-day, data characteristic: average value}. The secondary processing application 205a of the edge node 105a sends an index registration request to the index management unit 201a of the edge node 105a (S1907). The index registration request sent in this case includes an index, a storage position, a reference pointer, and a node ID.

When the reception unit 405 in the index management unit 201a of the edge node 105a receives an index registration request (S1909), the second registration unit 411 in the index management unit 201a of the edge node 105a executes an index registration process (B) (S1911).

FIG. 21 illustrates an example of the index table to which records are added by the index registration process (B). A record of which an index ID is A029 is added.

Referring back to the description of FIG. 19, the second registration unit 411 in the index management unit 201a of the edge node 105a sends a success notification to the secondary processing application 205a of the edge node 105a which is a request source (S1913)

When the secondary processing application 205a of the edge node 105a receives the success notification (S1915), a series of processes are ended.

The secondary processing application 205b of the edge node 105b performs processing similar to that of the secondary processing application 205a with respect to the average humidity instead of the average temperature. That is, secondary processed data in the secondary processing application 205b is the average daily humidity. FIG. 22 illustrates a configuration example of the index table at the point in time when the secondary processing application 205b of the edge node 105b generates secondary processed data. A record of which an index ID is B029 is added.

Subsequently, a sequence in a case where analysis on temperature is performed in the analysis application 207a will be described. FIG. 23 illustrates a sequence of analysis. The analysis application 207a of the edge node 105a sends an index search condition to the index management unit 201a of the edge node 105a (S2301). The index search condition in this example is that the data item name includes "temperature", the interval is "one-day", the data characteristic is "average value", and the time stamp is a predetermined date (for example, 2017 Apr. 1).

When the reception unit 405 in the index management unit 201a of the edge node 105a receives the index search condition (S2303), the first search unit 407 in the index management unit 201a of the edge node 105a searches for an index record matching the search condition (S2305). The first search unit 407 in the index management unit 201a of the edge node 105a sends a search result (S2307). In this example, it is assumed that "A029" of the index ID is included in the search result.

When the analysis application 207a of the edge node 105a receives the search result (S2309), the analysis application 207a proceeds to the acquisition sequence of the internal index (S2311). In the internal index acquisition sequence in this case, the analysis application 207a of the edge node 105a acquires an index record identified by an index ID "A029".

Eight sets of reference pointers and node IDs are set in the acquired index record. The first four groups indicate that the indexes held by the index record in secondary processing are referenced. In the following, a mode of referencing an index held by the index record is referred to as internal referencing. The latter four sets indicate that the index held by an external node is referenced in the secondary processing. In the following, a mode of referencing an index held by the external node is referred to as external referencing. The internal referencing and external referencing are also made in analysis described below.

The analysis application 207a of the edge node 105a specifies one set of the reference pointer and the node ID related to internal referencing (S2313). That is, sets in which a node ID coincides with the node ID of the node are sequentially specified. Then, in the acquisition sequence of the internal index, the edge node 105a acquires an index record specified by the set of the reference pointer and the node ID (S2315).

Similarly, for the set of reference pointers and node IDs related to other internal referencing, an index record specified by a set of the reference pointer and the node ID is acquired in an internal index acquisition sequence.

Subsequently, the analysis application 207a of the edge node 105a specifies one set of reference pointer and node ID related to external referencing (S2317). That is, sets in which a node ID does not coincide with the node ID of the node are sequentially specified. Then, in the acquisition sequence of the external index, the edge node 105a acquires an index record specified by the set of the reference pointer and the node ID (S2319).

Similarly, for the set of reference pointers and node IDs related to other external referencing, an index record specified by a set of the reference pointer and the node ID is acquired in an external index acquisition sequence.

As such, primary data referenced when secondary processed data specified by a certain index is generating is collected and analyzed. The content of the analysis will be omitted.

Similarly, the analysis application 207*b* of the edge node 105*b* performs analysis on the average humidity instead of the average temperature.

In the network system described above, the index may be deleted. Here, an example in which primary processed data and the index thereof are deleted will be described.

FIG. 24 illustrates a configuration example of an index table in which primary processed data is deleted. FIG. 24 illustrates a state in which indexes having index IDs A025 to A028 are deleted from the index table stored in the primary processed data storing unit 211*a* of the edge node 105*a*. That is, the records having the index IDs are deleted. Also, the index IDs and the node IDs corresponding to the index IDs set in the reference pointers are replaced by invalid codes.

Figure 25:
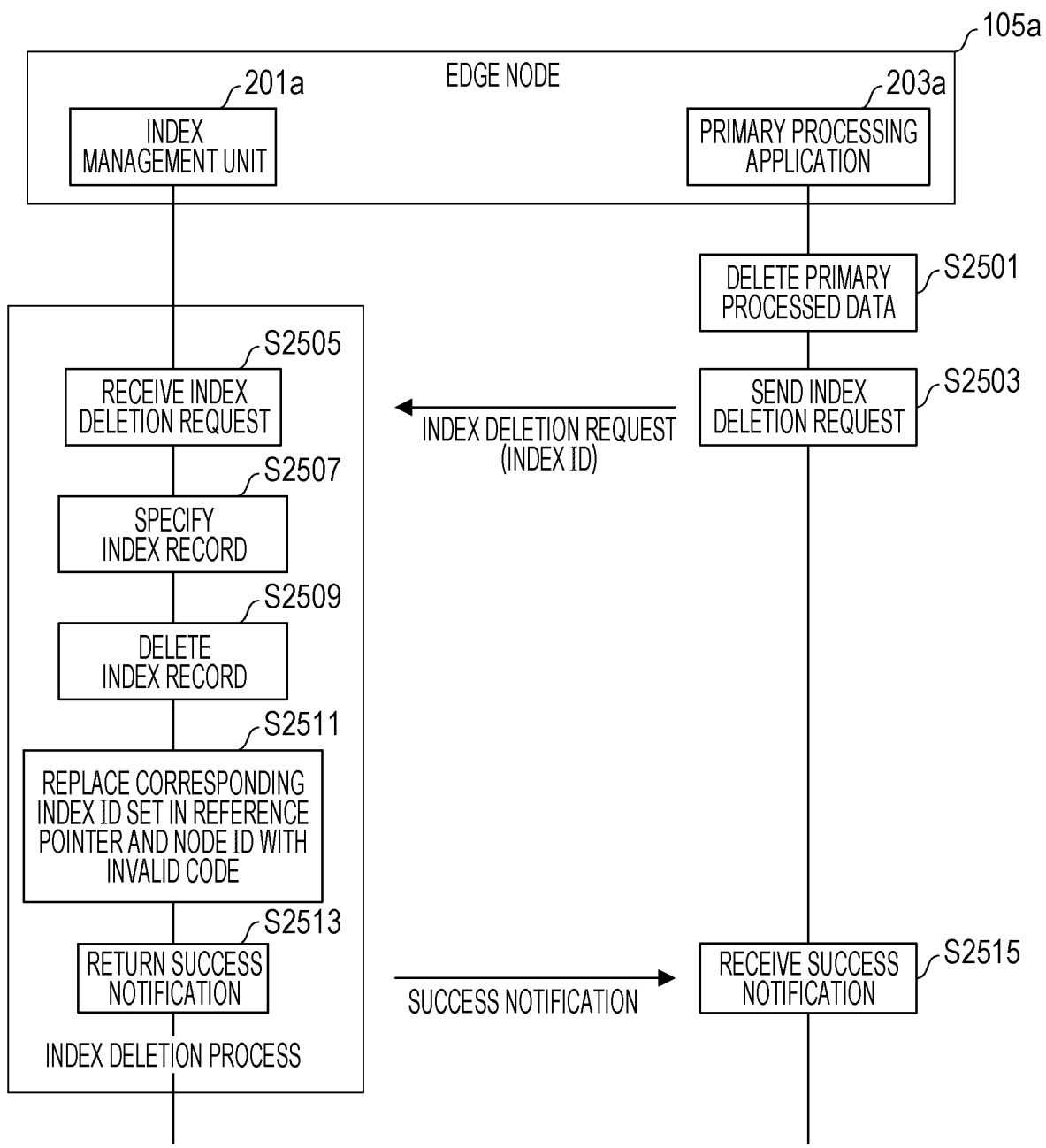
FIG. 25 is a diagram illustrating a sequence of index deletion.

FIG. 25 illustrates a sequence of index deletion. When the primary processing application 203*a* of the edge node 105*a* deletes primary processed data (S2501), the primary processing application 203*a* of the edge node 105*a* sends an index deletion request to the index management unit 201*a* of the edge node 105*a* holding the index of the primary processing data (S2503). The index deletion request includes an index ID to be deleted.

When the reception unit 405 in the index management unit 201*a* of the edge node 105*a* receives the index deletion request (S2505), the deletion unit 423 of the index management unit 201*a* of the edge node 105*a* specifies an index record of the index ID included in the index deletion request (S2507). Then, the deletion unit 423 in the index management unit 201*a* of the edge node 105*a* deletes the index record (S2509).

The invalidation unit 425 in the index management unit 201*a* of the edge node 105*a* replaces the index ID set in the field of the reference pointer of each index record and the node ID corresponding to the index ID with the invalid code (S2511). Then, the deletion unit 423 in the index management unit 201*a* of the edge node 105*a* returns a success notification to the primary processing application 203*a* of the requesting edge node 105*a* (S2513).

When the primary processing application 203*a* of the edge node 105*a* receives the success notification (S2515), a series of processes are ended.

As such, in a case where the index ID set in the reference pointer no longer exists, it is possible to omit the process of referencing the ID that does not exist by replacing the reference pointer with the invalid code.

However, the reference pointer set in an index table (index table in the index management unit 201*b* of the edge node 105*b* in this example) other than the deleted index table is not rewritten. That is, the index ID that no longer exists remains in the field of the reference pointer.

As illustrated in FIG. 26, for the index table in the index management unit 201*b* of the edge node 105*b* as well, it is desirable to replace the index ID and the node ID that do not exist with invalid codes. By doing as described above, a useless index acquisition process may be omitted in the analysis application 207*b* that collects primary processed data based on the index ID: B029, for example.

In a certain method, when an index is deleted in the index management unit 201, if an invalid index ID is notified to the index management unit 201 in another node, it is possible to rewrite the reference pointer and the node ID in the index management unit 201 of the other node. However, this method has a problem that the transmission load is large.

Accordingly, in Embodiment 1, IDs of deleted indexes are held together as a list, an index acquisition request from the index management unit 201 of another node device is received, and in a case where there is no such index, the ID of the index and other index IDs are sent together as a list. By doing so, transmission opportunities are reduced, so transmission addition is reduced.

Figure 27:
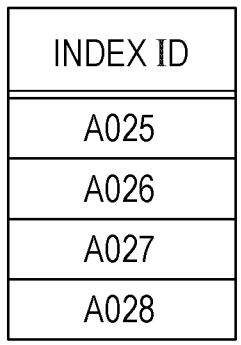
FIG. 27 is a diagram illustrating an example of an invalid index list.

FIG. 27 illustrates an example of an invalid index list. The invalid index list stores The ID of the deleted index, that is, an invalid index ID is stored in the invalid index list. In this example, A025, A026, A027 and A028, which are IDs of indexes deleted in the index management unit 201*a*, are registered.

In Embodiment 1, an invalid index table is generated in index deletion process corresponding to the process illustrated in S2505 to S2513 of FIG. 25.

Figure 28:
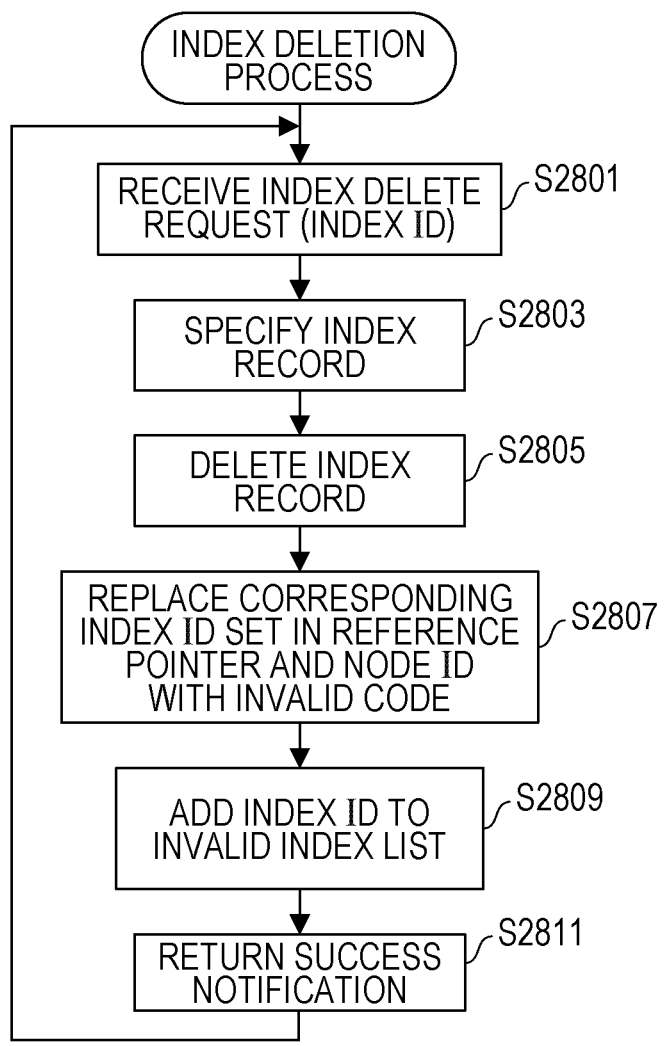
FIG. 28 is a diagram illustrating a flow of an index deletion process.

FIG. 28 illustrates an index deletion process flow in Embodiment 1. When the reception unit 405 receives an index deletion request (including an index ID) (S2801), the deletion unit 423 specifies an index record in which the index ID is set (S2803). Then, the deletion unit 423 deletes the identified index record (S2805).

In a case where the index ID is set in the reference pointer for each index record in the index table, the invalidation unit 425 replaces the index ID and the node ID corresponding to the index ID with invalid codes (S2807) for each index record in the index table.

The addition unit 427 adds the index ID to the invalid index list (S2809) and the deletion unit 423 returns the success notification to the request source (S2811).

In Embodiment 1, in a case where the index management unit 201 receives an invalid index list from the index management unit 201 of another node device, the index management unit 201 updates the invalid index list held by itself. Specifically, the index management unit 201 merges the received invalid index list and the invalid index list held by itself.

In this example, the index management unit 201 specifies an index ID to be survived by XOR (exclusive logical sum). That is, the index ID set in only one of the invalid index list held by the index management unit 201 or the received invalid index list is retained. That is, the index ID included in both invalid index lists is not retained. However, the index management unit 201 may specify the index ID to be survived by OR (logical sum).

Figure 29:
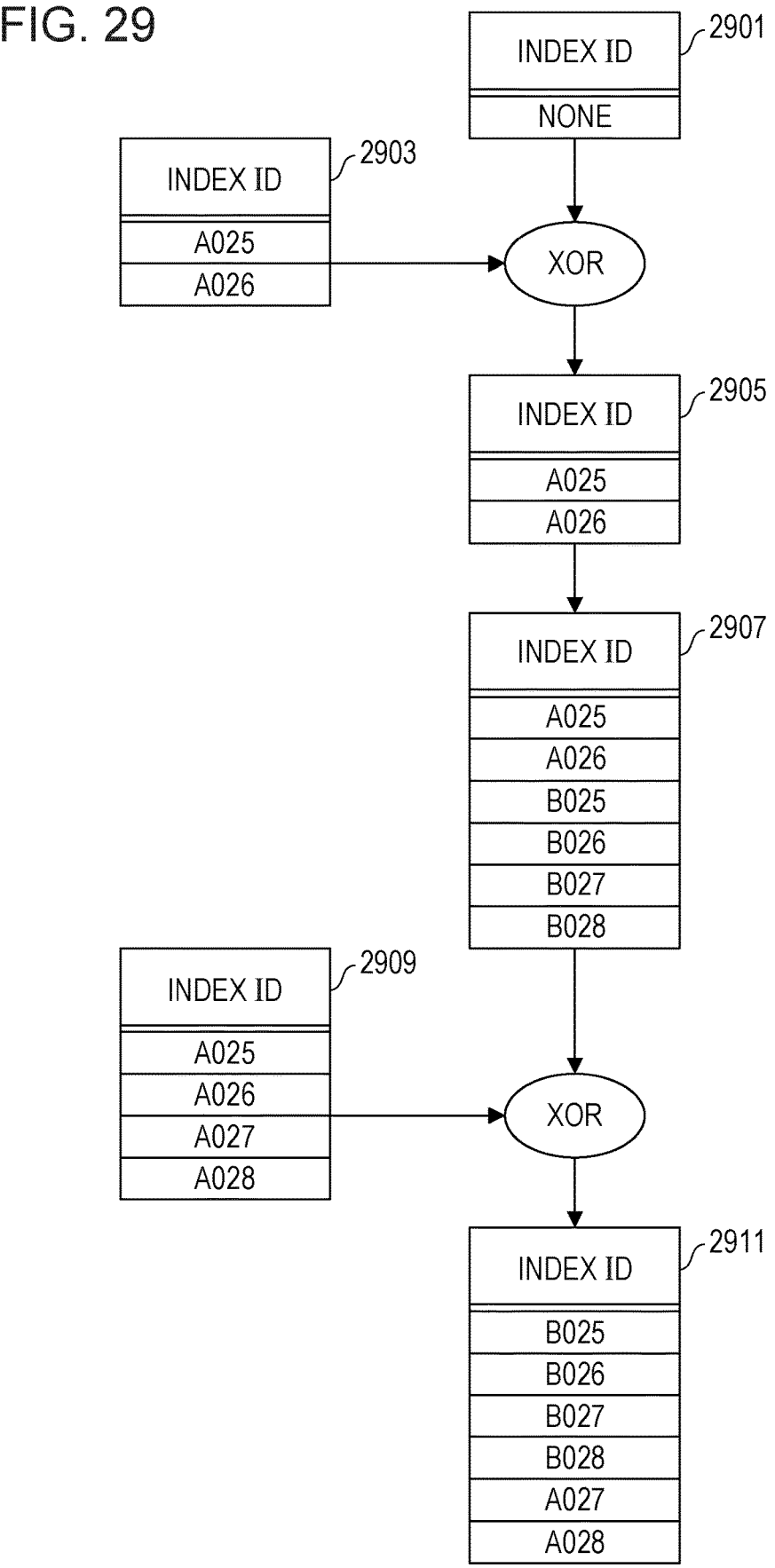
FIG. 29 is a diagram illustrating an example of merging invalid index lists.

FIG. 29 illustrates an example of merging the invalid index lists. Initially, the index management unit 201*b* of the edge node 105*b* holds an empty invalid index list 2901. In this case, it is assumed that the index management unit 201*b* of the edge node 105*b* sends an acquisition request of the index including the index ID: A025 to the index management unit 201*a* of the edge node 105*a*.

On the other hand, it is assumed that indexes of index ID: A025 and index ID: A026 were already deleted in the index table held by the index management unit 201*a* of the edge node 105*a*. Accordingly, the index management unit 201*b* of the edge node 105*b* receives the invalid index list 2903 in which the index IDs A025 and A026 are set.

The index management unit 201*b* of the edge node 105*b* searches for the field of the reference pointer in the index table held by the index management unit 201*b* and replaces the index IDs A025 and A026 with the invalid codes and the node ID corresponding to the reference pointer is also replaced with the invalid code.

Furthermore, in the index management unit 201*b* of the edge node 105*b*, the invalid index list 2901 and the invalid index list 2903 are merged and a new invalid index list 2905 is generated. In this case, the index IDs of A025 and A026 included only in the invalid index list 2903 are set in the invalid index list 2905. Accordingly, the invalid index list 2905 is held in the index management unit 201*b* of the edge node 105*b*.

Subsequently, it is assumed that the indexes specified by the index IDs B025, B026, B027 and B028 are deleted in the index management unit 201*b* of the edge node 105*b*. The index management unit 201*b* of the edge node 105*b* searches for the field of the reference pointer in the index table held by the index management unit 201*b* and replaces the index IDs of B025, B026, B027 and B028 with invalid codes, and the node corresponding to the reference pointer ID is also replaced with the invalid code.

In this case, the index IDs B025, B026, B027 and B028 are added to the invalid index list in the index management unit 201*a* of the edge node 105*a*.

Next, it is assumed that an index acquisition request including the index ID A027 is sent from the index management unit 201*b* of the edge node 105*b* to the index management unit 201*a* of the edge node 105*a*.

In this case, if the indexes of the index IDs A027 and A028 were already deleted in the index management unit 201*b* of the edge node 105*b*, the index management unit 201*b* of the edge node 105*b* receives an invalid index list 2903 in which the index IDs A025 to A028 are set.

The index management unit 201*b* of the edge node 105*b* searches for the field of the reference pointer in the index table held by the index management unit 201*b* and replaces the index IDs A027 and A028 with the invalid codes and the node ID corresponding to the reference pointer is also replaced with the invalid code.

Furthermore, in the index management unit 201*b* of the edge node 105*b*, an invalid index list 2907 and an invalid index list 2909 are merged, and a new invalid index list 2911 is generated.

In this case, the index IDs of A025 and A026 included in both the invalid index list 2907 and the invalid index list 2909 are not set in the invalid index list 2911. Since the index IDs B025, B026, B027 and B028 are included only in the invalid index list 2907, the index IDs B025, B026, B027 and B028 are set in the invalid index list 2911. Since the index IDs A027 and A028 newly received are not included in the invalid index list 2907, the index IDs A027 and A028 are set in the invalid index list 2911.

By doing as described, it is possible to avoid enlargement of the invalid index list.

For the index IDs A025 and A026 in this example, at the time of receiving a first invalid index list, invalidation of the reference pointer and the node ID is completed. Accordingly, there is no problem even if the index IDs A025 and A026 are not left at the time of receiving a second invalid index list.

However, index IDs (for example, A025 and A026) once excluded may be recovered. When the invalid index list including the index IDs A025 and A026 is received again in a state of holding the invalid index list 2911 of FIG. 29, the index IDs A025 and A026 are also set.

Accordingly, in Embodiment 1, control is performed so that the invalid index list is not frequently sent to the same partner on a transmission side of the invalid index list. Specifically, a predetermined number of IDs of node devices to which the invalid index list is recently sent are held, and the invalid index list is not retransmitted to the devices.

Figure 30:
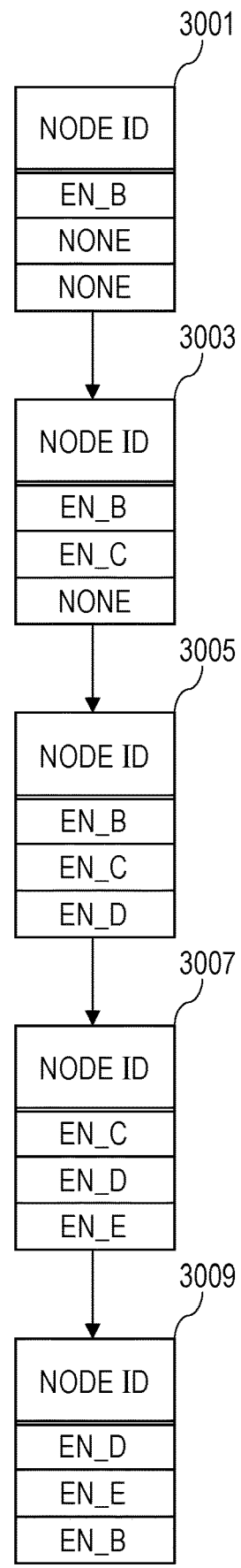
FIG. 30 is a diagram illustrating an example of transition of a transmission destination list.

Control based on the transmission destination list will be described with reference to FIG. 30. In the transmission destination list, a node ID specifying the node device corresponding to the transmission destination of the invalid index list is stored. FIG. 30 illustrates a transmission destination list in the edge node 105*a*.

An initial transmission destination list 3001 illustrates a state after the invalid index list is transmitted to the edge node 105*b* of which the node ID is EN_B.

Thereafter, when an invalid index list is transmitted to the edge node 105*c* of which the node ID is EN_C, the EN_C is added to a transmission destination list 3003.

Next, when the invalid index list is transmitted to the edge node 105*d* of which the node ID is EN_D, EN_D is added to a transmission destination list 3005.

Next, when an invalid index list is transmitted to the edge node 105*e* of which the node ID is EN_E, EN_E is added to a transmission destination list 3007. In this case, the oldest node ID: EN_B is deleted.

Next, when an invalid index list is transmitted to the edge node 105*b* of which the node ID is EN_B, EN_B is added to a transmission destination list 3009. In this case, the oldest node ID: EN_C is deleted.

As such, only the transmission destinations that are traced back the predetermined number of times is retained.

Figure 31:
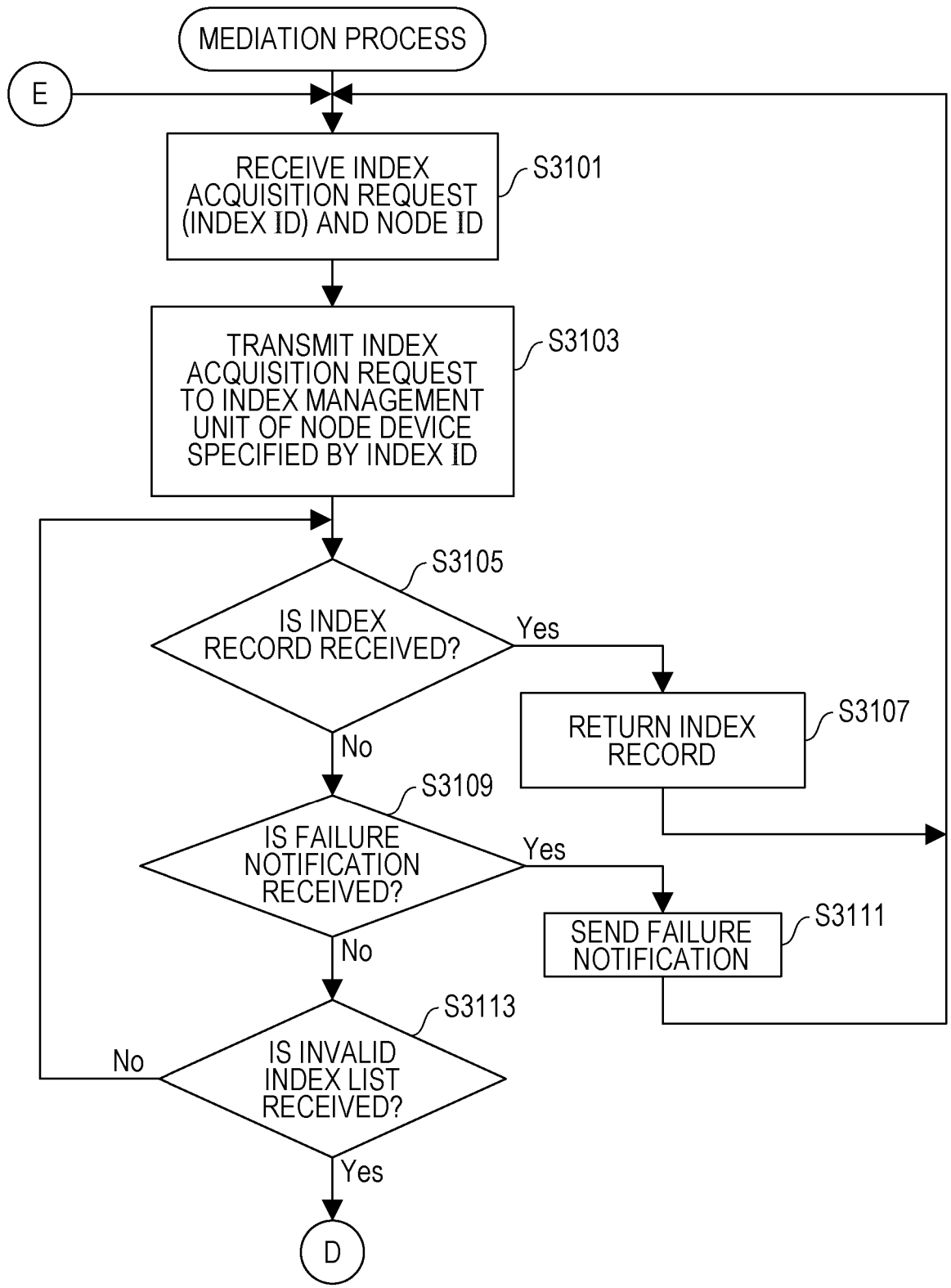
FIG. 31 is a diagram illustrating a flow of a mediation process.

Subsequently, a mediation process corresponding to processes of S1803, S1805, S1813, and S1815 illustrated in FIG. 18 will be described. FIG. 31 illustrates a mediation process flow.

When the reception unit 405 receives an index acquisition request (including an index ID) and a node ID from an application (S3101), the second transfer unit 421 transmits an index acquisition request to the index management unit 201 of the node device specified by the node ID (S3103).

Thereafter, the second reception unit 415 determines whether an index record is received or not, as a result of the process in the index management unit 201 of the node device specified by the index ID (S3105).

In a case where it is determined that the index record is received, the second transfer unit 421 returns the received index record to the application which is a request source (S3107). Then, the process returns to processing illustrated in S3101 and the process described above is repeated.

On the other hand, when it is determined that the index record is not received, the second reception unit 415 determines whether a failure notification is received or not, as the result of the process in the index management unit 201 of the node device specified by the index ID (S3109).

In a case where it is determined that the failure notification is received, the second transfer unit 421 sends the failure notification to the application which is a request source (S3111).

On the other hand, in a case where it is determined that the failure notification is not received, the second reception unit 415 determines whether an invalid index list is received or not, as the result of the process in the index management unit 201 of the node device specified by the index ID (S3113).

In a case where it is determined that the invalid index list is not received, the process returns to processing illustrated in S3105, and the process described above is repeated.

Figure 32:
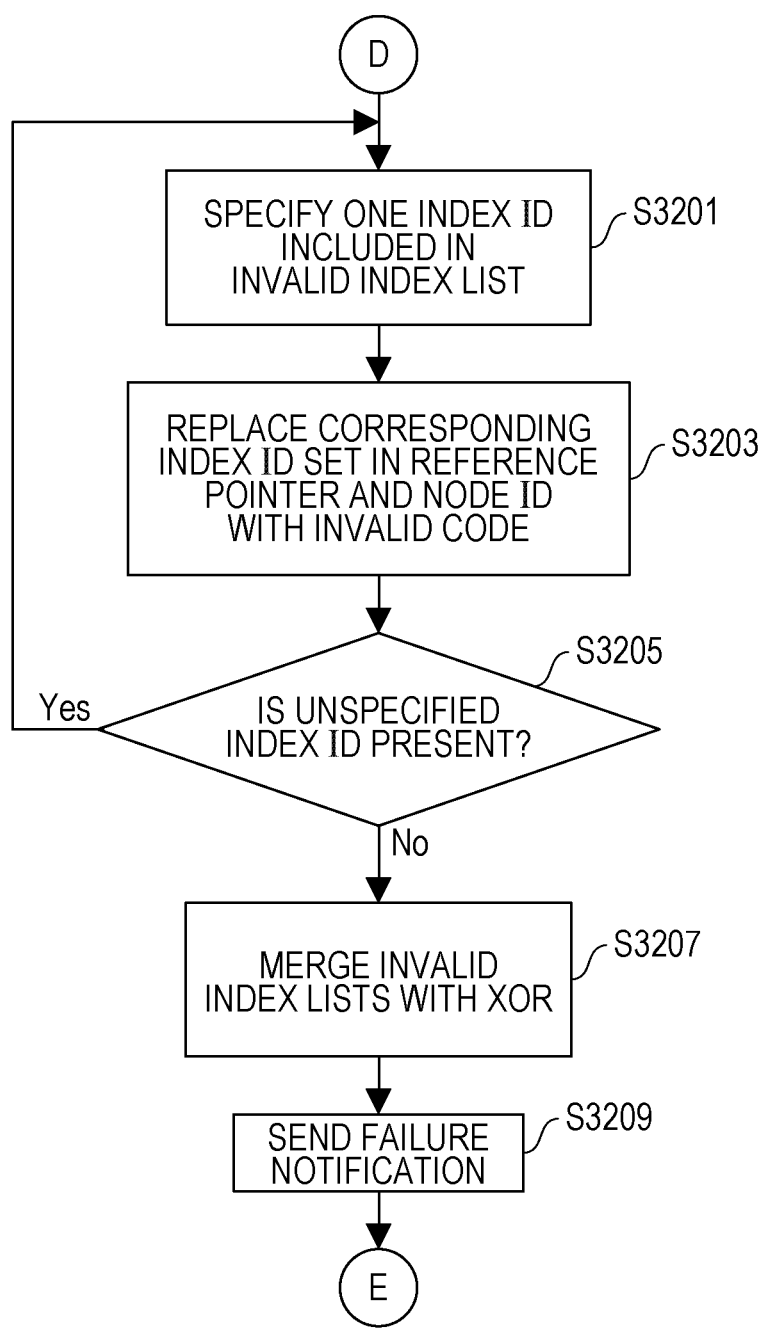
FIG. 32 is a diagram illustrating a flow of a mediation process.

On the other hand, in a case where it is determined that the invalid index list is received, the process proceeds to processing of S3201 illustrated in FIG. 32 via a terminal D.

The invalidation unit 425 specifies one index ID included in the invalid index list (S3201). The invalidation unit 425 sets an invalid code in the field in which a specified index ID is set, among of the fields of the reference pointer in the index table. That is, if the index ID set in the reference pointer is deleted, the index ID is replaced with invalid code.

The invalidation unit 425 also replaces the node ID corresponding to the replaced reference pointer with the invalid code (S3203).

The invalidation unit 425 determines whether an unspecified index ID is present, among the index IDs included in the invalid index list, or not (S3205). In a case where it is determined that the unspecified index ID is present, the process returns to processing illustrated in S3201 and the process described above is repeated.

On the other hand, in a case where it is determined that the unspecified index ID is not present, the merge unit 429 merges two invalid index lists with the XOR operation as described above (S3207). Then, the second transfer unit 421 sends a failure notification to the application which is a request source (S3209).

Thereafter, the process returns to processing illustrated in S3101 illustrated in FIG. 31 via a terminal E, and the process described above is repeated.

Figure 33:
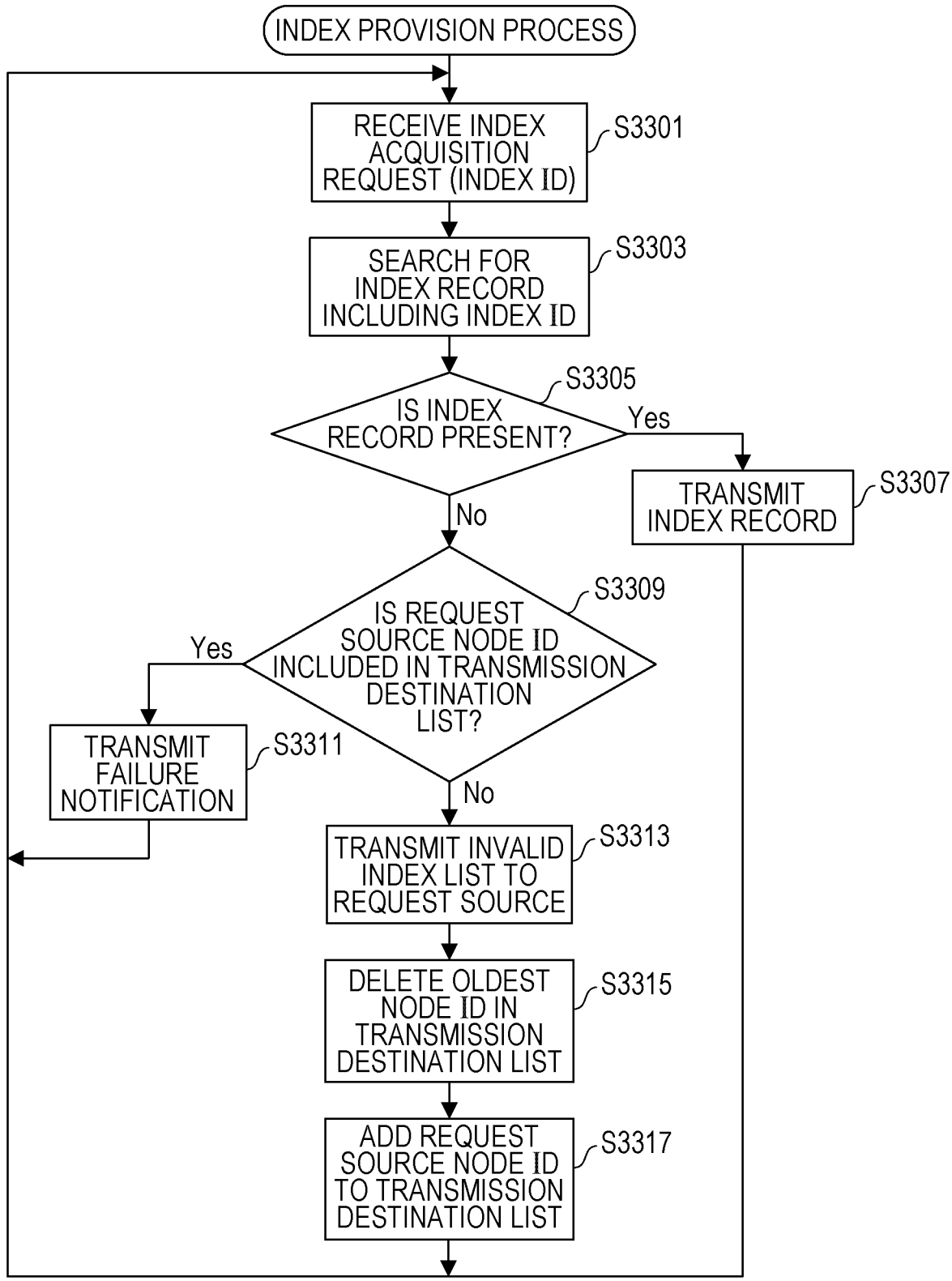
FIG. 33 is a diagram illustrating a flow of an index provision process.

Subsequently, the index provision process corresponding to processing of S1807 to S1811 illustrated in FIG. 18 will be described. FIG. 33 illustrates an index provision process flow.

When the second reception unit 415 receives an index acquisition request (including an index ID) from the external index management unit 201 (S3301), the second provision unit 419 searches for an index record in which an index ID included in the index acquisition request is set (S3303).

The second provision unit 419 branches processing depending on whether an index record in which the index ID is set is present or not (S3305). In a case where an index record in which the index ID is set is present, the second provision unit 419 transmits the index record to the index management unit 201 which is a request source (S3307).

On the other hand, in a case where the index record in which the index ID is set is not present, the list transmission unit 431 determines whether the ID of the node device which is a request source of index acquisition is included in the transmission destination list or not (S3309). In a case where it is determined that the ID of the request source node device is included in the transmission destination list, the list transmission unit 431 transmits a failure notification to the index management unit 201 of the request source (S3311). That is, transmission of the invalid index list is omitted.

On the other hand, in a case where it is determined that the ID of the request source node device is not included in the transmission destination list, the list transmission unit 431 transmits the invalid index list to the request source index management unit 201 (S3313).

If there is no vacancy in the transmission destination list, the list transmission unit 431 deletes the oldest node ID in the transmission destination list (S3315). Then, the list transmission unit 431 adds a request source node ID to the transmission destination list (S3317). The process returns to processing of S3301 to repeat the process described above.

According to Embodiment 1, it is possible to reduce the transmission load for notifying the identifier of the deleted index.

Furthermore, since the reference pointer is invalidated based on the invalid index list, it is not possible to perform useless index referencing.

Furthermore, since the invalid index list held by being merged with the received invalid index list is updated, the contents of the received invalid index list may be spread indirectly.

Furthermore, since the index ID is selected by the exclusive logical sum, it is possible to avoid enlargement of the invalid index list to be held.

Furthermore, since the invalid index list is not sent to the node device in the transmission destination list, useless retransmission is reduced.

Embodiment 2

In Embodiment 2, a bidirectional pointer is provided for frequently referenced relationships, and in a case where an index that is frequently referenced is deleted, a notification (hereinafter, referred to as an invalid index notification) notifying that the index is invalid is sent to a node device that references the index. Then, a reference pointer and a node ID are invalidated in the node device that references the index.

First, a reference counter table used for counting the number of times of reference will be described. FIG. 34 illustrates an example of the reference counter table. The reference counter table in this example has a record corresponding to a referenced index. The record of the reference counter table has a field in which an index ID is stored, a field in which the node ID is stored, and a field in which the number of times of reference is stored. The index ID and the node ID specify the referenced index.

FIG. 35 illustrates a configuration example of an index table according to Embodiment 2. The index record according to Embodiment 2 has a field for storing a reference source node ID. The reference source node ID specifies a node device frequently referencing the index.

Figure 36:
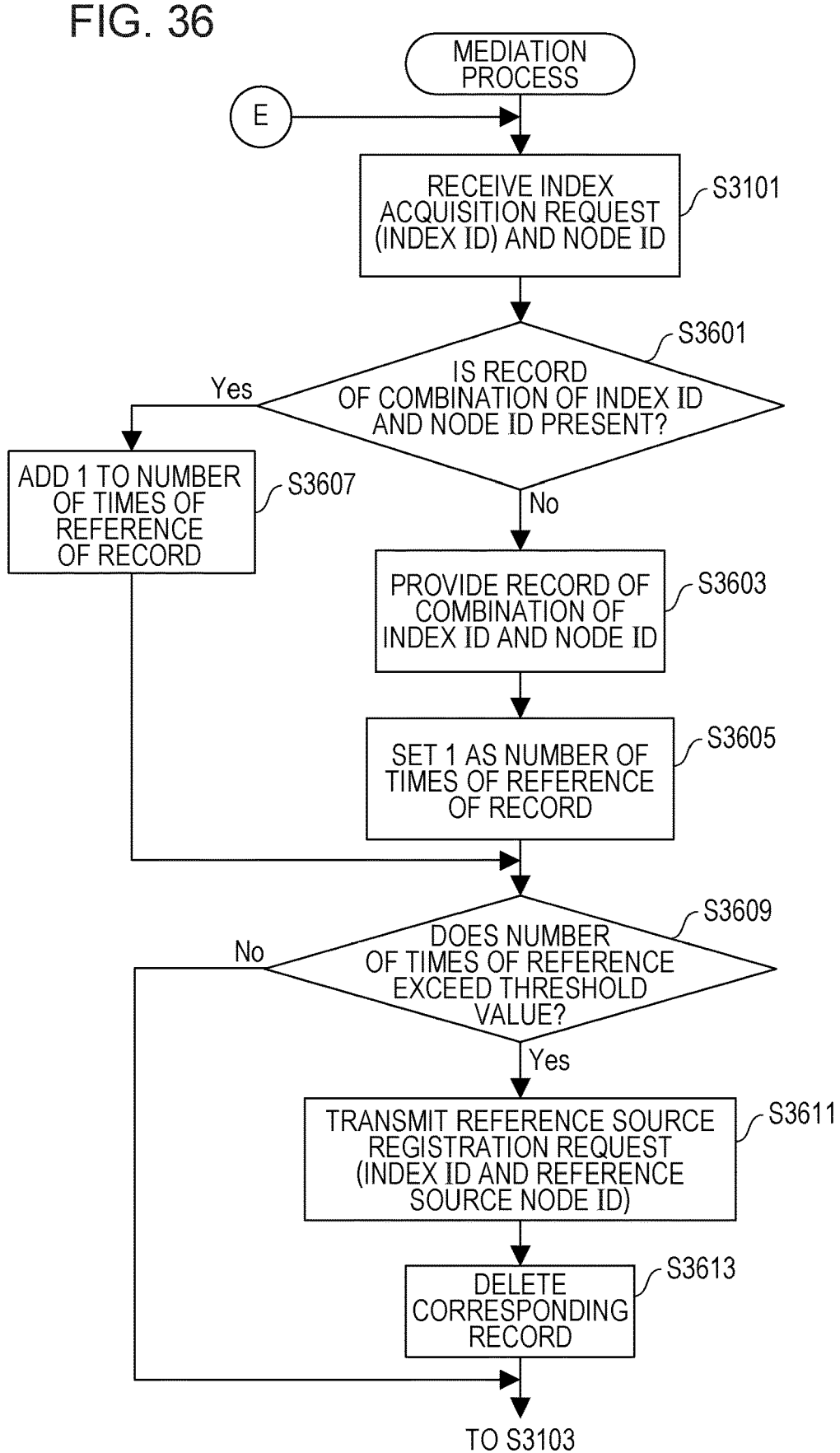
FIG. 36 is a diagram illustrating a flow of a mediation process according to Embodiment 2.

FIG. 36 illustrates a mediation process flow according to Embodiment 2. Matters different from the case of the mediation process illustrated in FIG. 31 will be described. The mediation process is a process in the node device that references the index, that is, in the reference source.

The processing in S3101 is the same as that in the case of FIG. 31. The counting unit 433 determines whether a record of a combination of the index ID included in the index acquisition request and the node ID added to the request is present in the reference counter table or not (S3601).

In a case where it is determined that the record of the combination of the index ID and the node ID is not present in the reference counter table, the counting unit 433 sets a record of a combination of the index ID and the node ID (S3603). Then, the counting unit 433 sets 1 as the number of times of reference the record (S3605).

On the other hand, in a case where it is determined that the record of the combination of the index ID and the node ID is present in the reference counter table, the counting unit 433 adds 1 to the number of times of reference of the record (S3607).

The request transmission unit 435 determines whether the number of times of reference exceeds a threshold value or not (S3609). In a case where it is determined that the number of times of reference does not exceed the threshold value, the process directly proceeds to processing illustrated in S3103 of FIG. 31. Processing in and after S3103 is the same as that in the case of FIGS. 31 and 32.

In a case where it is determined that the number of times of reference exceeds the threshold value, the request transmission unit 435 transmits a reference source registration request (S3611). In the reference source registration request, the index ID included in the index acquisition request and the ID of the node device itself (hereinafter, referred to as a reference source node ID) are included. Then, in the reference counter table, the counting unit 433 deletes the record in which the index ID and the reference source node ID are set (S3613). Then, the process proceeds to processing denoted by S3103 in FIG. 31. Processing in and after S3103 is the same as that in the case of FIGS. 31 and 32.

Figure 37:
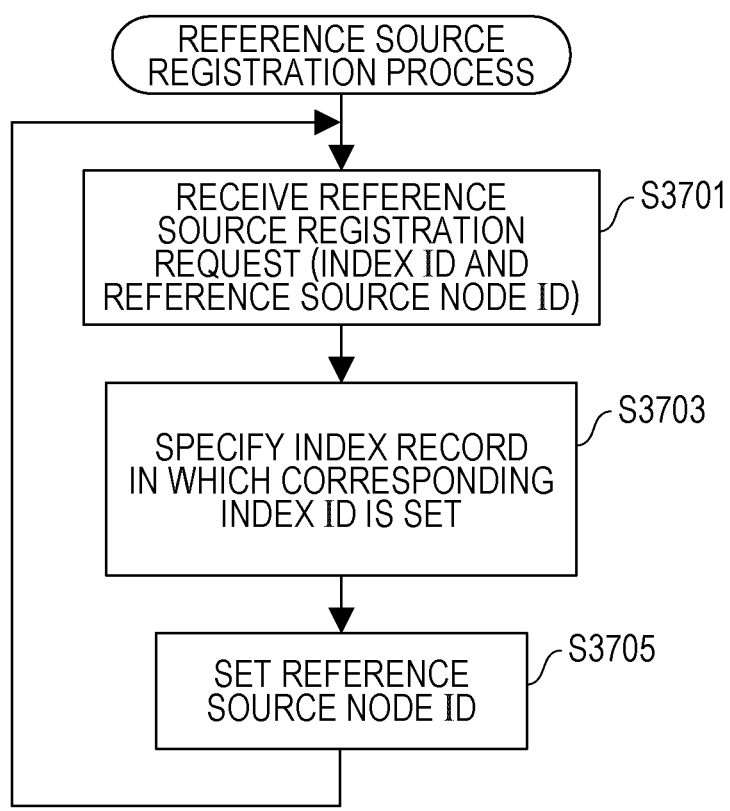
FIG. 37 is a diagram illustrating a flow of a registration process of a reference source.

Subsequently, a process in the referenced node device, that is, a reference destination will be described. FIG. 37 illustrates a process flow of a process for registering a reference source (referred to as reference source registration process).

When the second reception unit 415 receives a reference source registration request (including the index ID and the referring node ID) (S3701), the registration unit 437 specifies an index record in which an index ID included in the reference source registration request is set (S3703). Then, the registration unit 437 sets a reference source node ID included in the reference source registration request in the index record (S3705). Then, the process returns to processing denoted by S3701, the process described above is repeated. With the process described as above, the bidirectional pointer is in a state of being set.

Figure 38:
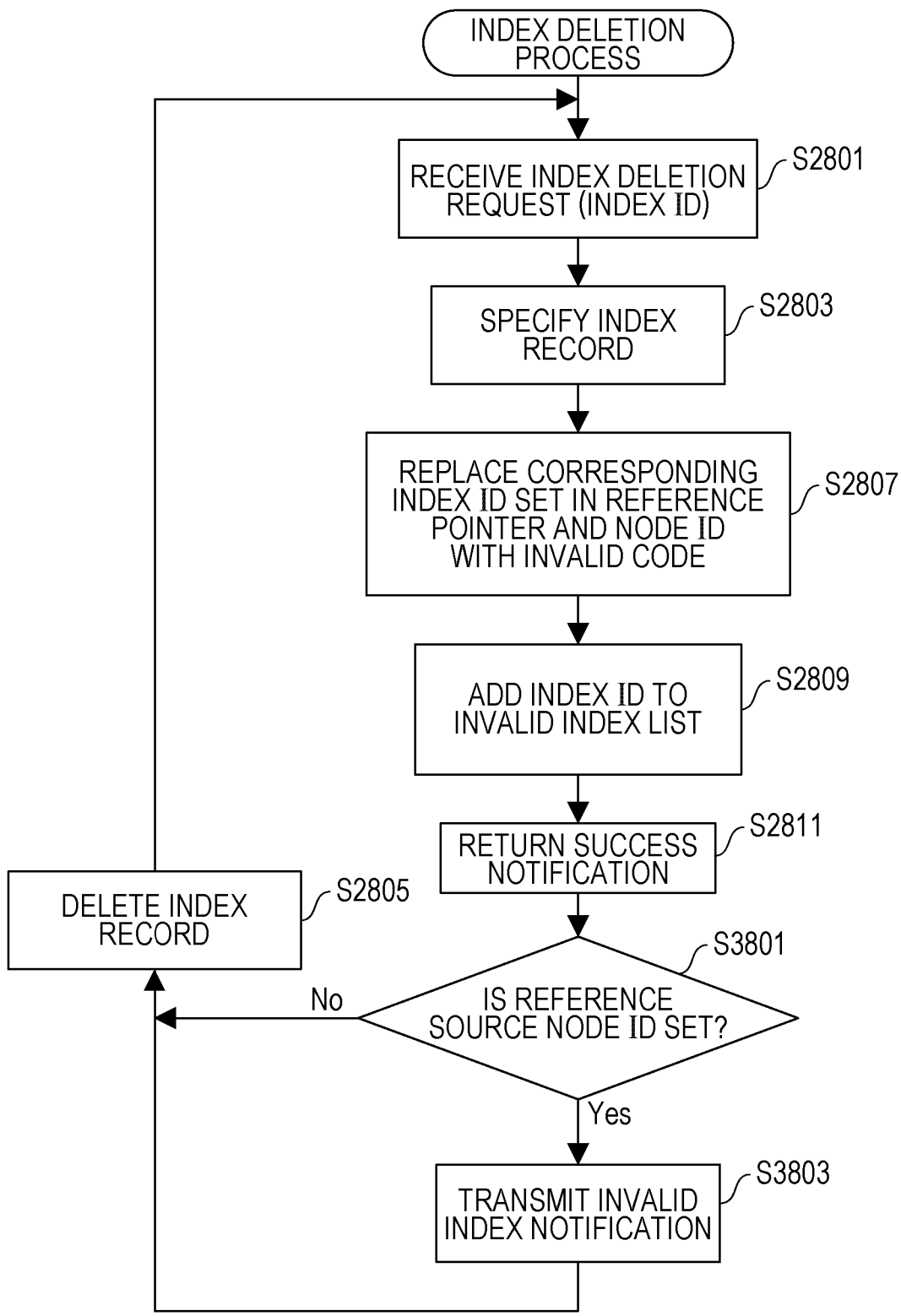
FIG. 38 is a diagram illustrating a flow of an index deletion process according to Embodiment 2.

Subsequently, a processing in a case where the index is deleted will be described. FIG. 38 illustrates an index deletion process flow according to Embodiment 2. This process is a process in the reference destination.

Processing of S2801, S2803, and S2807 through S2811 is the same as that in the case of FIG. 28.

The notification transmission unit 439 determines whether the reference source node ID is set in the index record specified in S2803 or not (S3801). In a case where it is determined that the reference source node ID is not set in the index record, the deletion unit 423 deletes the index record (S2805). Then, the process returns to the processing denoted by S2801, the process described above is repeated.

On the other hand, in a case where it is determined that the reference source node ID is set in the index record, the notification transmission unit 439 transmits an invalid index notification to the index management unit 201 of the node device specified by the reference source node ID (S3803). In the invalid index notification, the ID of the deleted index and the ID of the node device itself are included. The deletion unit 423 deletes the index record (S2805). Then, the process returns to processing denoted by S2801, the above-described processing is repeated.

Figure 39:
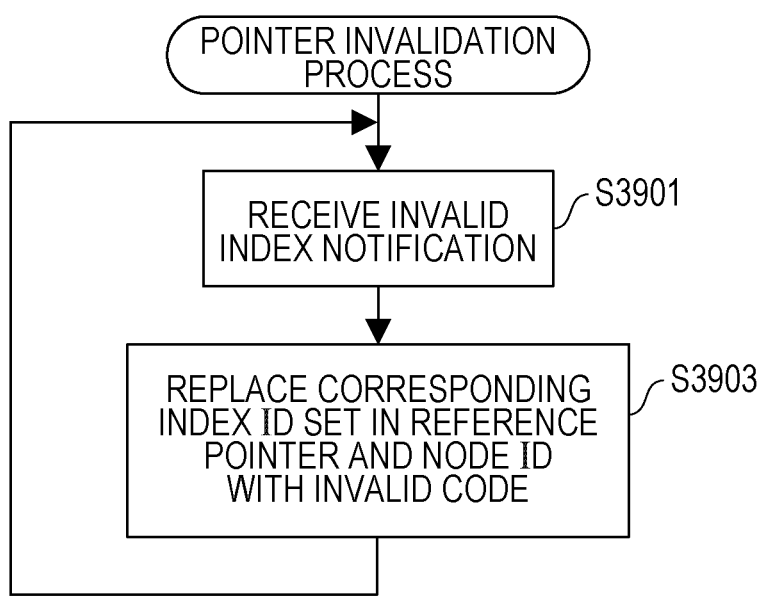
FIG. 39 is a diagram illustrating a flow of a pointer invalidation process.

FIG. 39 illustrates a pointer invalidation process flow. This process is a process in the reference source. When the second reception unit 415 receives an invalid index notification (S3901), the invalidation unit 425 sets the invalid code in the field in which the index ID included in the invalid index notification is set, among the fields of the reference pointer in the index table. Furthermore, the invalidation unit 425 also replaces the node ID corresponding to a replaced reference pointer with the invalid code (S3903). Then, the process returns to S3901.

According to Embodiment 2, it is possible to quickly notify a device, which frequently references a certain index, that the index is deleted.

The embodiments have been described above, but are not limited thereto. For example, the functional block configuration described above may not match the program module configuration.

The configuration of each storage area described above is only an example, may not have the configuration described above. Furthermore, also in the process flow, if the process result does not change, the process order may be switched, or a plurality of processes may be executed in parallel.

The edge node 105 described above is a computer device and as illustrated in FIG. 40, a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 for connecting to a network are connected by a bus 2519 in the edge node 105. An operating system (OS) and an application program for executing processes in the embodiment are stored in the HDD 2505, and are read out from the HDD 2505 to the memory 2501 when executed by the CPU 2503. The CPU 2503 controls the display control unit 2507, the communication control unit 2517, and the drive unit 2513 in accordance with the processing content of the application program to perform a predetermined operation. Data being processed is mainly stored in the memory 2501, but may also be stored in the HDD 2505. In the embodiments, the application program for carrying out the processes described above is stored in the computer readable removable disk 2511 and distributed, and is installed from the drive device 2513 to the HDD 2505. The application program may be installed in the HDD 2505 via a network such as the Internet and the communication control unit 2517. Such a computer device realizes various functions as described above in such a way that hardware such as the CPU 2503 and the memory 2501 and the programs such as the OS and the application program organically cooperate with each other.

The embodiments described above may be summarized as follows.

The distributed data management program according to the embodiments includes (A) adding an identifier of a deleted index of a plurality of indexes which specify storage positions of data to be distributed and are held in an information processing apparatus for holding the plurality of indexes in a network system to a first invalid list held by the information processing apparatus in a case where any one of the held indexes is deleted and (B) transmitting the first invalid list to the information processing apparatus in a case where it is determined that an index requested from the information processing apparatus is not held.

By doing as described above, a transmission load for notifying an identifier of a deleted index may be reduced.

Furthermore, in a case where a second invalid list including an identifier of an index deleted in another distributed data management apparatus is received, a reference pointer in which the identifier of the index included in the second invalid list is set may be invalidated.

By doing as described above, useless index referencing may not be performed.

Furthermore, the first invalid list may be updated by merging the first invalid list and the second invalid list.

By doing as described above, the contents of the second invalid list may be indirectly spread.

Furthermore, in the merging, an identifier included in the first invalid list after update may be specified by an exclusive logical sum operation of the identifier included in the first invalid list and the identifier included in the second invalid list.

By doing as described above, it is possible to avoid enlargement of the first invalid list.

Furthermore, a transmission destination may be stored every time the first invalid list is transmitted. Then, transmission of the first invalid list to the information processing apparatus corresponding to the transmission destination traced back to the predetermined number of times may be omitted.

By doing as described above, it is possible to suppress the number of times of transmission of the first invalid list.

Furthermore, in a case where a registration request of an information processing apparatus of which the number of times of acquisition requests for the same index exceeds a predetermined value is received from the information processing apparatus, the identifier of the information processing apparatus may be stored in association with the index. Then, in a case where any of the stored indexes is deleted, a notification of the identifier of the deleted index may be transmitted to a destination specified by an identifier of the information processing apparatus corresponding to the deleted index.

By doing as described above, it is possible to quickly inform the apparatus frequently referencing a certain index that the index is deleted.

A program for causing a computer to perform the process according to the method described above may be created, and the program may be stored in a computer-readable storage medium such as a flexible disk, a CD-ROM, a magneto-optical disk, a semiconductor memory, a hard disk, or a storage device. An intermediate process result is generally temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a distributed data management program that causes a distributed data management apparatus, for holding a plurality of indexes which specify storage positions of data to be distributed in a network system, to execute a process, the process comprising:
    adding an identifier of a deleted index to a first invalid list held by the distributed data management apparatus when a held index is deleted;
    transmitting the first invalid list to the information processing apparatus when it is determined that an index requested from an information processing apparatus is not held;
    invalidating a reference pointer in which an identifier of an index included in a second invalid list is set in a case where a second invalid list including an identifier of an index deleted in another distributed data management apparatus is received; and
    updating the first invalid list by merging the first invalid list and the second invalid list,
    wherein an identifier included in the first invalid list after the update is specified by an exclusive logical sum of the identifier included in the first invalid list and the identifier included in the second invalid list, in the merging.

2. The storage medium according to claim 1, the process further comprising:
    storing a transmission destination every time the first invalid list is transmitted; and
    omitting transmission of the first invalid list to the information processing apparatus corresponding to the transmission destination traced back to a predetermined number of times.

3. The storage medium according to claim 1, the process further comprising:
    in a case where a registration request of an information processing apparatus of which a number of times of acquisition requests for the same index exceeds a predetermined value is received from the information processing apparatus, storing an identifier of the information processing apparatus in association with the index; and
    in a case where any one of the held indexes is deleted, transmitting a notification of an identifier of the deleted index to a destination specified by the identifier of the information processing apparatus corresponding to the deleted index.

4. A distributed data management method performed by a distributed data management apparatus for holding a plurality of indexes which specify storage positions of data to be distributed in a network system, the method comprising steps of:
    adding an identifier of a deleted index to a first invalid list held by the distributed data management apparatus when a held index is deleted;
    transmitting the first invalid list to the information processing apparatus when it is determined that an index requested from an information processing apparatus is not held;
    invalidating a reference pointer in which an identifier of an index included in a second invalid list is set in a case where a second invalid list including an identifier of an index deleted in another distributed data management apparatus is received; and
    updating the first invalid list by merging the first invalid list and the second invalid list,
    wherein an identifier included in the first invalid list after the update is specified by an exclusive logical sum of the identifier included in the first invalid list and the identifier included in the second invalid list, in the merging.

5. A distributed data management apparatus for holding a plurality of indexes which specify storage positions of data to be distributed in a network system, the apparatus comprising:
    a memory, and
    a processor coupled to the memory and configured to:
    adding an identifier of a deleted index to a first invalid list held by the distributed data management apparatus when a held index is deleted;
    transmitting the first invalid list to the information processing apparatus when it is determined that an index requested from an information processing apparatus is not held;
    invalidating a reference pointer in which an identifier of an index included in a second invalid list is set in a case where a second invalid list including an identifier of an index deleted in another distributed data management apparatus is received; and
    updating the first invalid list by merging the first invalid list and the second invalid list,
    wherein an identifier included in the first invalid list after the update is specified by an exclusive logical sum of the identifier included in the first invalid list and the identifier included in the second invalid list, in the merging.

6. A distributed data management method performed by a distributed data management apparatus, the method comprising:
    storing a plurality of indexes which specify positions of data to be distributed in a network system;

adding an identifier of a deleted index to a first invalid list stored in the distributed data management apparatus when a stored index is deleted;
receiving a request from an information processing apparatus; and
transmitting the first invalid list to the information processing apparatus when an index associated with the received request is not stored in the plurality of indexes;
receiving a second invalid list including an identifier of an index deleted in another distributed data management apparatus is received;
invalidating a reference pointer within the distributed data management apparatus to an identifier of an index included in the second invalid list; and
updating the first invalid list by merging the first invalid list and the second invalid list,
wherein an identifier included in the first invalid list after the update is specified by an exclusive logical sum of the identifier included in the first invalid list and the identifier included in the second invalid list, in the merging.

* * * * *